(12) United States Patent
Bonilla et al.

(10) Patent No.: US 8,583,563 B1
(45) Date of Patent: Nov. 12, 2013

(54) SYSTEM AND METHOD FOR PROVIDING ENHANCED MATCHING BASED ON PERSONALITY ANALYSIS

(75) Inventors: Francisco J. Bonilla, Carrollton, TX (US); Sharmistha Dubey, Coppell, TX (US); Amanda W. Ginsberg, Dallas, TX (US); James C. Moore, Frisco, TX (US); Walter M. Presz, III, Richardson, TX (US); Clark T. Rothrock, McKinney, TX (US); Helen E. Fisher, New York, NY (US)

(73) Assignee: Match.com, L.L.C., Dallas, TX (US)

( * ) Notice: Subject to any disclaimer, the term of this patent is extended or adjusted under 35 U.S.C. 154(b) by 395 days.

(21) Appl. No.: 12/342,158

(22) Filed: Dec. 23, 2008
(Under 37 CFR 1.47)

(51) Int. Cl.
*G06Q 99/00* (2006.01)
*G06Q 10/00* (2012.01)

(52) U.S. Cl.
USPC ............................................. 705/319; 705/1.1

(58) Field of Classification Search
USPC ................................................... 705/1.1, 319
See application file for complete search history.

(56) References Cited

U.S. PATENT DOCUMENTS

| | | | |
|---|---|---|---|
| 4,173,016 A | 10/1979 | Dickson | |
| 4,789,907 A | 12/1988 | Fischetti et al. | |
| 5,086,394 A | 2/1992 | Shapira | |
| 5,164,897 A | 11/1992 | Clark et al. | |
| 5,305,195 A | 4/1994 | Murphy | |
| 5,606,361 A | 2/1997 | Davidsohn et al. | |
| 5,623,660 A | 4/1997 | Josephson | |
| 5,681,046 A | 10/1997 | Lawrence | |
| 5,694,464 A | 12/1997 | Mashinsky | |
| 5,696,981 A * | 12/1997 | Shovers | ........................ 704/10 |
| 5,775,695 A | 7/1998 | Byers | |
| 5,818,836 A | 10/1998 | DuVal | |
| 5,832,432 A | 11/1998 | Trader et al. | |
| 5,835,087 A | 11/1998 | Herz et al. | |

(Continued)

FOREIGN PATENT DOCUMENTS

| | | |
|---|---|---|
| DE | 3508448 A1 | 3/1995 |
| EP | 0148406 B1 | 3/1989 |
| EP | 0649121 B1 | 1/2000 |
| WO | WO 02/13053 A2 | 2/2002 |

OTHER PUBLICATIONS

Frodi, Ann M. et al. Fathers' and Mothers' Responses to Infant Smiles and Cries. Infant Behavior and Development. vol. 1, pp. 187-198. Jan. 1978. Available Online Jul. 7, 2005.*

(Continued)

*Primary Examiner* — Jonathan Quellette
*Assistant Examiner* — Amanda Kirlin
(74) *Attorney, Agent, or Firm* — Patent Capital Group

(57) ABSTRACT

In one example embodiment, a method is provided that includes interfacing with one or more end users via a central website and managing information related to one or more of the end users. The method also includes determining a personality type for one or more end users and matching end users based on relationship rules of the personality types that outline compatibilities between the personality types. In more specific embodiments, the determining of the personality type includes an evaluation of a hand of a selected end user. The personality types can be based on inferred levels of testosterone, serotonin, or estrogen. The personality type determination can also be made based on a set of questions. The personality type determination can also be based on evaluating a selected end user's word choice and/or the frequency in their word choice in their writing.

20 Claims, 33 Drawing Sheets

(56) References Cited

U.S. PATENT DOCUMENTS

| | | | |
|---|---|---|---|
| 5,850,428 A | 12/1998 | Day | |
| 5,862,223 A | 1/1999 | Walker et al. | |
| 5,884,270 A | 3/1999 | Walker et al. | |
| 5,907,677 A | 5/1999 | Glenn et al. | |
| 5,909,670 A | 6/1999 | Trader et al. | |
| 5,950,200 A | 9/1999 | Sudai et al. | |
| 5,956,716 A | 9/1999 | Kenner et al. | |
| 5,963,951 A | 10/1999 | Collins | |
| 5,996,006 A | 11/1999 | Speicher | |
| 6,148,067 A | 11/2000 | Leipow | |
| 6,181,867 B1 | 1/2001 | Kenner et al. | |
| 6,185,532 B1 | 2/2001 | Lemaire et al. | |
| 6,202,055 B1 | 3/2001 | Houvener et al. | |
| 6,253,188 B1 | 6/2001 | Witek et al. | |
| 6,272,467 B1 | 8/2001 | Durand et al. | |
| 6,356,893 B1 | 3/2002 | Itakura et al. | |
| 6,480,885 B1 | 11/2002 | Olivier | |
| 6,564,213 B1 | 5/2003 | Ortega et al. | |
| 6,581,037 B1* | 6/2003 | Pak | 705/1.1 |
| 6,633,885 B1 | 10/2003 | Agrawal et al. | |
| 6,643,681 B1 | 11/2003 | Saito et al. | |
| 6,647,355 B2 | 11/2003 | Heinberg et al. | |
| 6,658,391 B1 | 12/2003 | Williams et al. | |
| 6,735,568 B1 | 5/2004 | Buckwalter et al. | |
| 6,775,775 B1 | 8/2004 | Yoshiura et al. | |
| 6,857,024 B1 | 2/2005 | Chen et al. | |
| 6,868,160 B1 | 3/2005 | Raji | |
| 6,873,693 B1 | 3/2005 | Langseth et al. | |
| 6,952,679 B1* | 10/2005 | Pulford | 705/7.41 |
| 7,043,443 B1 | 5/2006 | Firestone | |
| 7,069,308 B2 | 6/2006 | Abrams | |
| 7,085,806 B1 | 8/2006 | Shapira | |
| 7,092,952 B1 | 8/2006 | Wilens | |
| 7,117,254 B2 | 10/2006 | Lunt et al. | |
| 7,188,153 B2 | 3/2007 | Lunt et al. | |
| 7,203,674 B2 | 4/2007 | Cohen | |
| 7,246,067 B2 | 7/2007 | Austin et al. | |
| 7,254,406 B2 | 8/2007 | Beros et al. | |
| 7,264,474 B2 | 9/2007 | Sullivan et al. | |
| 7,277,888 B2 | 10/2007 | Gelormine et al. | |
| 7,342,503 B1 | 3/2008 | Light et al. | |
| 7,394,388 B1 | 7/2008 | Light et al. | |
| 7,401,098 B2 | 7/2008 | Baker | |
| 7,613,706 B2 | 11/2009 | Terrill et al. | |
| 7,617,134 B2 | 11/2009 | Terrill et al. | |
| 7,676,466 B2 | 3/2010 | Terrill et al. | |
| 7,761,386 B2* | 7/2010 | Teicher | 705/319 |
| 8,010,546 B2 | 8/2011 | Terrill et al. | |
| 8,010,556 B2 | 8/2011 | Terrill et al. | |
| 8,010,566 B2 | 8/2011 | Cho et al. | |
| 8,051,013 B2 | 11/2011 | Terrill et al. | |
| 8,090,602 B2* | 1/2012 | Teicher | 705/5 |
| 8,097,625 B2* | 1/2012 | Lalji et al. | 514/247 |
| 8,117,091 B2 | 2/2012 | Terrill et al. | |
| 8,195,668 B2* | 6/2012 | Drennan et al. | 707/748 |
| 8,219,501 B2* | 7/2012 | Teicher | 705/319 |
| 8,260,641 B2* | 9/2012 | Teicher | 705/5 |
| 2001/0011211 A1* | 8/2001 | Bushey et al. | 703/22 |
| 2001/0031454 A1 | 10/2001 | Mintz | |
| 2001/0048449 A1 | 12/2001 | Baker | |
| 2002/0045154 A1 | 4/2002 | Wood et al. | |
| 2002/0059369 A1 | 5/2002 | Kern et al. | |
| 2002/0091556 A1 | 7/2002 | Fiala et al. | |
| 2002/0103692 A1 | 8/2002 | Rosenberg et al. | |
| 2002/0178057 A1 | 11/2002 | Bertram et al. | |
| 2003/0078976 A1 | 4/2003 | Gordon | |
| 2003/0088554 A1 | 5/2003 | Ryan et al. | |
| 2003/0191673 A1 | 10/2003 | Cohen | |
| 2004/0054546 A1* | 3/2004 | Levin et al. | 705/1 |
| 2004/0093334 A1 | 5/2004 | Scherer | |
| 2004/0128148 A1 | 7/2004 | Austin et al. | |
| 2004/0167794 A1 | 8/2004 | Shostack et al. | |
| 2004/0210661 A1 | 10/2004 | Thompson | |
| 2004/0249811 A1 | 12/2004 | Shostack et al. | |
| 2004/0260781 A1 | 12/2004 | Shostack et al. | |
| 2005/0038876 A1 | 2/2005 | Chaudhuri | |
| 2005/0060183 A1 | 3/2005 | Haupt | |
| 2005/0153678 A1 | 7/2005 | Tiberi | |
| 2005/0177528 A1 | 8/2005 | Qamar | |
| 2005/0235062 A1 | 10/2005 | Lunt | |
| 2006/0041401 A1 | 2/2006 | Johnston | |
| 2006/0059130 A1 | 3/2006 | Weiss et al. | |
| 2006/0059142 A1 | 3/2006 | Zvinyatskovsky et al. | |
| 2006/0059147 A1 | 3/2006 | Weiss et al. | |
| 2006/0059159 A1 | 3/2006 | Truong et al. | |
| 2006/0106667 A1 | 5/2006 | Coyne | |
| 2006/0121426 A1 | 6/2006 | Scoresby et al. | |
| 2006/0122903 A1* | 6/2006 | Medrano et al. | 705/26 |
| 2006/0126095 A1 | 6/2006 | Tamura et al. | |
| 2006/0136498 A1 | 6/2006 | Insley | |
| 2006/0149625 A1 | 7/2006 | Koningstein | |
| 2006/0179111 A1 | 8/2006 | Verona | |
| 2006/0287928 A1 | 12/2006 | Terrill et al. | |
| 2007/0005750 A1 | 1/2007 | Lunt et al. | |
| 2007/0030824 A1 | 2/2007 | Ribaudo et al. | |
| 2007/0031800 A1 | 2/2007 | Solomon | |
| 2007/0032240 A1 | 2/2007 | Finnegan et al. | |
| 2007/0050354 A1* | 3/2007 | Rosenberg | 707/5 |
| 2007/0061159 A1* | 3/2007 | Vest | 705/1 |
| 2007/0069901 A1 | 3/2007 | Tuck et al. | |
| 2007/0072468 A1 | 3/2007 | Terrill et al. | |
| 2007/0073548 A1 | 3/2007 | Terrill et al. | |
| 2007/0073549 A1 | 3/2007 | Terrill et al. | |
| 2007/0073687 A1 | 3/2007 | Terrill et al. | |
| 2007/0073711 A1 | 3/2007 | Terrill et al. | |
| 2007/0073802 A1* | 3/2007 | Terrill et al. | 709/203 |
| 2007/0073803 A1 | 3/2007 | Terrill et al. | |
| 2007/0112762 A1 | 5/2007 | Brubaker | |
| 2007/0141541 A1* | 6/2007 | Chan et al. | 434/236 |
| 2007/0162458 A1 | 7/2007 | Fasciano | |
| 2007/0233730 A1 | 10/2007 | Johnston | |
| 2008/0059217 A1 | 3/2008 | Austin et al. | |
| 2008/0109429 A1 | 5/2008 | Petrin | |
| 2008/0222535 A1 | 9/2008 | Zrike et al. | |
| 2008/0254419 A1* | 10/2008 | Cohen | 434/219 |
| 2008/0301557 A1 | 12/2008 | Kotlyar | |
| 2009/0070133 A1 | 3/2009 | Bonilla et al. | |
| 2009/0322597 A1 | 12/2009 | Medina-Herrero et al. | |
| 2010/0017375 A1 | 1/2010 | Terrill et al. | |
| 2010/0017469 A1 | 1/2010 | Terrill et al. | |
| 2010/0077032 A1 | 3/2010 | Drennan et al. | |
| 2010/0125530 A1 | 5/2010 | Terrill et al. | |
| 2010/0246576 A1 | 9/2010 | Bustamente | |
| 2010/0283827 A1 | 11/2010 | Bustamente | |
| 2010/0285856 A1 | 11/2010 | Thomas | |
| 2010/0287286 A1 | 11/2010 | Bustamente | |
| 2011/0313647 A1 | 12/2011 | Koebler | |
| 2012/0226991 A1 | 9/2012 | Drennan et al. | |

OTHER PUBLICATIONS

Zitzmann, M et al. 'Testosterone levels in healthy men and the relation to behavioural and physical characteristics: facts and constructs.' European Journal of Endocrinology (2001). 144. pp. 183-197.*

Hinsz, V. B., and J. A. Tomhave. "Smile and (Half) the World Smiles with You, Frown and You Frown Alone." Personality and Social Psychology Bulletin 17.5 (1991): 586-92. Print.*

Miles, Lynden, Johston, Lucy. Detecting Happiness: Perceiver Sensitivity to Enjoyment and Non-Enjoyment Smiles. Journal of Nonverbal Behavior. 31.4 (Dec. 2007): 259-275.*

Factiva, "MicroVoice, InterStep offer personals," Seybold Report on Publishing Systems, vol. 25, No. 21, 2 pages, Jul. 29, 1997.

Factiva, "IBM Teams with Electric Classifieds," Seybold Report on Publishing Systems, vol. 25, No. 21, 1 page, Jul. 29, 1996.

Neil Marks, "Home Alone and Wired for Romance," The Mail on Sunday, 1 page, May 19, 1996.

Mitch Ratcliffe, Write once, publish many times: Electric Classifieds Inc.'s flexible publishing technology (middleware for online publishing), Digital Media, vol. 5, No. 3, ISSN: 1056-7038, 4 pages, Aug. 7, 1995.

(56) References Cited

OTHER PUBLICATIONS

Factiva, "Desktop Video: VDOLive Will Enable Motion Video on the Internet; Conquers Internet's Technical Challenges & Will Make Desktop Video Broadcasting Applications Possible," Edge, 2 pages, Nov. 6, 1995.

Factiva, "Electronic Classifieds: U S West Marketing Resources Teams with Denver's Rocky Mountain News," Edge, vol. 9, No. 323, ISSN: 0890-9563, 2 pages, Oct. 3, 1994.

Ric Manning, "Singles Use Newest Approach: Multimedia," Louisville Courier-Journal, 2 pages, May 3, 1994.

Factiva, "Nexpo '96 Preview: Something for Everyone in Las Vegas, part 6," Seybold Report on Publishing Systems, vol. 25, No. 17, 3 pages, May 31, 1996.

Marco R. Della Cava, "Truth in advertising hits Internet dating; Services help potential mates spot scammers," USA Today, ProQuest #62115951, 6 pages, Apr. 20, 2004.

LookBetterOnline: Internet Archive Wayback Machine; www.archive.org; collection of web pages from http://lookbetteronline.com, 23 pages, May 19, 2004, Jun. 14, 2004.

Notification of Transmittal of the International Search Report and the Written Opinion of the International Search Authority, or the Declaration (3 pages); Written Opinion of the International Searching Authority (5 pages), and International Search Report (4 pages) for International Application No. PCT/US 06/23518 mailed May 21, 2008.

Microsoft, "Immedient Improves and Streamlines Hiring with Microsoft Office Solution Accelerator for Recruiting," Published Sep. 2003, 4 pages.

Drogehorn et al., Personalised applications and services for a mobile user, Apr. 4-8, 2005, IEEE, 473-479 (7 pages).

Chen Zhou et al., DAML-QoS ontology for Web services, Jul. 6-9, 2004, IEEE 472-479 (8 pages).

Supjarerndee et al., Recruitment filtering with personality-job fit model, Apr. 8-10, 2002, IEEE, 6 pages.

Wilson et al., Design guidelines for parallel algorithms using continuous job profiles, Apr. 30-May 2, 1991, IEEE, pp. 30-36.

Foner, L., "A Multi-Agent Referral System for Matchmaking," MIT Media Lab, 1996, (8 pages).

Baker, Frank, "Anthropological Notes on the Human Hand," American Anthropologist, vol. A1, Issue 1, Jan. 1888 (pp. 51-76).

Offringa, Peter "Zoosk—The Engineering behind Real Time Communications," available online at <URL http://highscalability.com/blog/2012/8/27/zoosk-the-engineering-behind-real-time-communications.html>, Aug. 27, 2012 (4 pages).

Zoosk Customer Support, "How Do I Video Chat?" available online at <URL https://zoosk.zendesk.com/entries/20513017-how-do-i-video-chat> Oct. 7, 2011 (3 pages).

Chun, et al., "Comparison of Online Social Relations in Terms of Volume vs. Interaction: A Case Study of Cyworld," IMC '08, Oct. 20-22, 2008, Vouliagmeni, Greece (ACM 978-1-60558-334-1/08/10) (pp. 57-69).

Fiore, et al., "Online Personals: An Overview," CHI 2004, Apr. 24-29, 2004, Vienna, Austria (ACM 1-58113-703-6/04/0004) (pp. 1395-1398).

* cited by examiner

FIG. 2A chemistry

| Home | New Matches | My Account | Archives | | Home | Help | Your Profile | Archives | Sign Out |
|---|---|---|---|---|---|---|---|---|---|
| Summary | My Profile | Interested in You | Archives | My Personality Profile | | | Email | | |
| | | | | Active Matches | | | | | |

Your Profile

| Profile Details | Photo Gallery | Profile Activation | Profile Visibility |
|---|---|---|---|
| Edit or update your profile. Allow 24 to 48 hours for your revised profile to be approved. | Add new photos, delete photos, or change your primary photo. Allow 24 to 48 hours for approval. | Activate your profile for matching, or make it inactive while you take a break. | Control how and when matches see your photos. |
| Edit Profile | Add/Edit Photos | Edit Preferences | Edit Preferences |

How your profile appears to others:

Todd
30 yr old Man
Denver, Colorado

How We Match
Matches are based on our compatibility Personality Profile which Identifies long-term relationship potential through variables such as similar or shared interests, values, background and goals.
more...

Next Step

Select your level of interest.

No Interest —— Moderate —— High Interest

Let us know your level of interest in this match.
Move the slider in either direction and then click Next to continue. Why is this important?

[ Next > ]

TO FIG. 2B

FROM FIG. 2A

Profile Summary

I'm a big believer in working hard and playing hard. Those who know me best appreciate my spontaneity, honesty, grin and ability to turn the ordinary into something great. Having a balance is important to me, and this shines through in not only my love for sports and hanging out with buddies, but also in my appreciation for the finer things in life. There are a million ways to describe the perfect match, but what I'm looking for is someone who appreciates the thousands of daily niceties that go into making a relationship work. I want a teammate, a best friend, someone to walk beside and behind and one in which our shared laughter gets us through the good times and bad.

Looking for: 25 to 45 year old Woman
within 50 miles of Denver, Colorado

Relationship history: Single (never been married)
Ethnic background: White/Caucasian
Body type: Athletic/toned
Height: 6'3" (190.5 cms)

Height 6'3" (190.5 cms)
Eyes: Brown
Build: Athletic/toned
Hair Color: Blonde
Full Profile

FROM FIG. 3B

Extravert
Friendly, talkative and outgoing. Often takes on leadership roles. Comfortable around others, especially large groups.

You ▽
[E] [B] [N] [D]

Agreeable
Easygoing in nature. Can be tolerant and accommodating of others. Interested in creating harmony and building consensus.

You ▽
[E] [B] [N] [D]

Conscientious
Determined to meet or exceed stated goals. Disciplined and extremely focused at work. Not easily distracted.

You ▽
[E] [B] [N] [D]

Open to New Experiences
Interested in innovation, experimentation and new solutions. Willing to try new experiences. Creative, original thinker.

You ▽
[E] [B] [N] [D]

Emotional Stability
Strong and steady, not easily upset. Level-headed in response to unforeseen changes or problems. Calm, cool and collected.

You ▽
[E] [B] [N] [D]

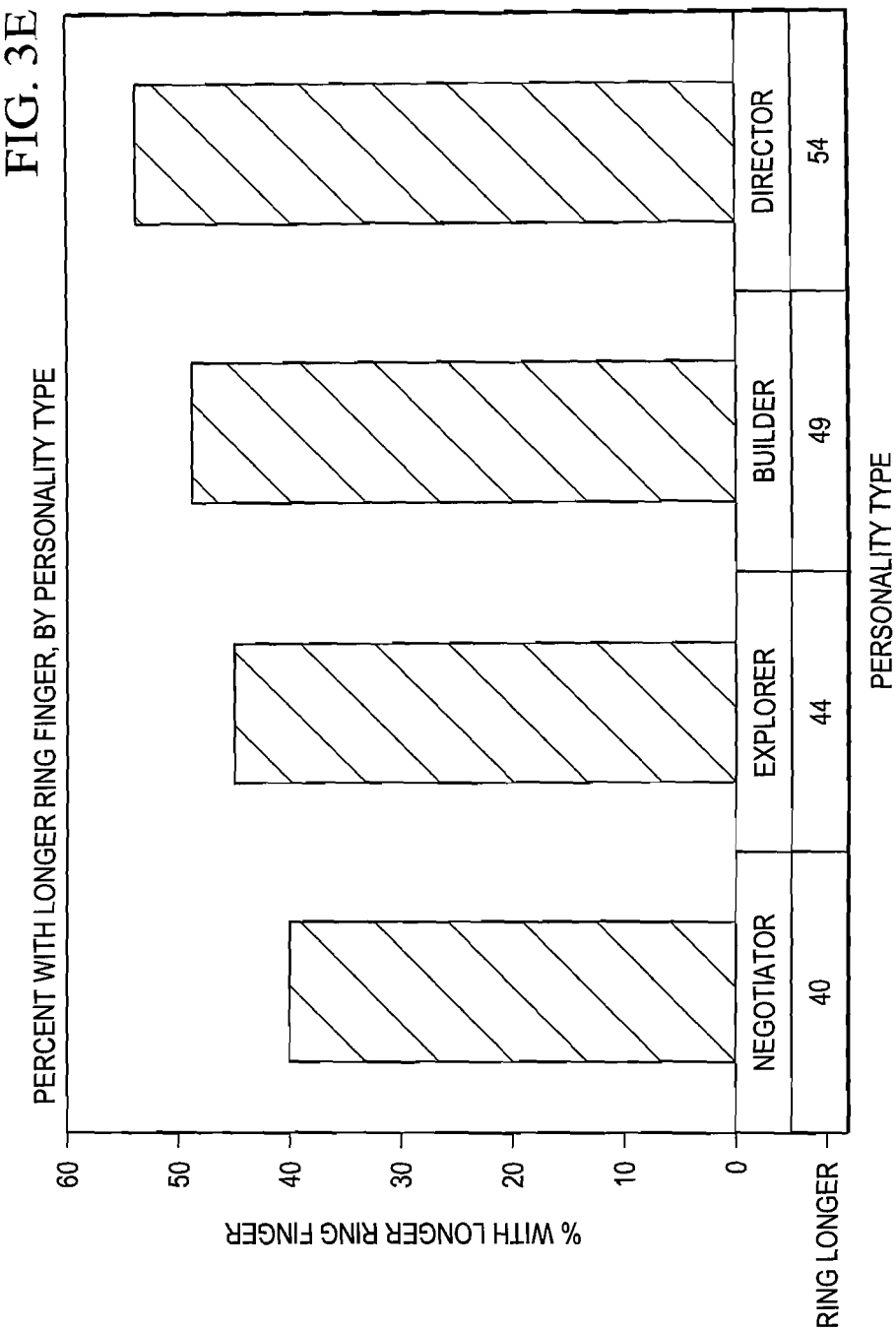

FIG. 3F

| | MEANS | | |
|---|---|---|---|
| | RELATIVE LENGTH | | STD. DEVIATION |
| NEGOTIATOR | 2.2 | 549 | 1.028214 |
| EXPLORER | 2.3 | 545 | 1.016964 |
| BUILDER | 2.4 | 564 | 1.048758 |
| DIRECTOR | 2.5 | 342 | 1.073901 |

FIG. 3G

| | PERCENT | |
|---|---|---|
| | RING LONGER | INDEX LONGER/EQUAL |
| NEGOTIATOR | 40 | 60 |
| EXPLORER | 44 | 56 |
| BUILDER | 49 | 51 |
| DIRECTOR | 54 | 46 |

FIG. 3H

| | EXPLORER | BUILDER | DIRECTOR | NEGOTIATOR | MEAN | STD. DEVIATION |
|---|---|---|---|---|---|---|
| E1 I FIND UNPREDICTABLE SITUATIONS EXHILARATING | 0.39 | -0.15 | 0.18 | 0.11 | 1.07 | 0.66 |
| E2 I DO THINGS ON THE SPUR OF THE MOMENT | 0.42 | -0.13 | 0.11 | 0.14 | 1.89 | 0.64 |
| E3 I GET BORED WHEN I HAVE TO DO THE SAME FAMILIAR THINGS | 0.28 | -0.09 | 0.08 | 0.12 | 1.66 | 0.71 |
| E4 I HAVE A WIDE RANGE OF INTERESTS | 0.45 | 0.01 | 0.25 | 0.18 | 2.23 | 0.63 |
| E5 I AM MORE OPTIMISTIC THAN MOST PEOPLE | 0.35 | 0.08 | 0.13 | 0.08 | 1.94 | 0.70 |
| E6 I AM MORE CREATIVE THAN MOST PEOPLE | 0.35 | 0.00 | 0.23 | 0.23 | 1.85 | 0.73 |
| E7 I AM ALWAYS LOOKING FOR NEW EXPERIENCES. | 0.57 | 0.00 | 0.24 | 0.20 | 2.07 | 0.62 |
| E8 I AM ALWAYS DOING NEW THINGS | 0.56 | 0.02 | 0.25 | 0.14 | 1.69 | 0.64 |
| E9 I AM MORE ENTHUSIASTIC THAN MOST PEOPLE | 0.48 | 0.08 | 0.16 | 0.16 | 1.79 | 0.67 |
| E0 I AM WILLING TO TAKE RISKS TO DO WHAT I WANT TO DO | 0.46 | -0.03 | 0.27 | 0.16 | 1.97 | 0.65 |
| E11 I GET RESTLESS IF I HAVE TO STAY HOME FOR ANY LENGTH OF TIME | 0.28 | -0.02 | 0.06 | 0.10 | 1.50 | 0.79 |

| | | FROM FIG. 3H | | | | |
|---|---|---|---|---|---|---|
| E12 MY FRIENDS WOULD SAY I AM VERY CURIOUS | 0.38 | -0.03 | 0.24 | 0.26 | 1.91 | 0.66 |
| E13 I HAVE MORE ENERGY THAN MOST PEOPLE | 0.44 | -0.09 | 0.22 | 0.04 | 1.68 | 0.70 |
| E14 ON MY TIME OFF, I LIKE TO BE FREE TO DO WHATEVER LOOKS FUN | 0.35 | 0.04 | 0.16 | 0.19 | 2.12 | 0.57 |
| B1 I THINK CONSISTENT ROUTINES KEEP LIFE ORDERLY AND RELAXING | -0.13 | 0.34 | 0.05 | 0.04 | 1.69 | 0.59 |
| B2 I CONSIDER (AND RECONSIDER) EVERY OPTION THOROUGHLY BEFORE MAKING A PLAN | -0.01 | 0.33 | 0.19 | 0.12 | 1.68 | 0.68 |
| B3 PEOPLE SHOULD BEHAVE ACCORDING TO ESTABLISHED STANDARDS OF PROPER CONDUCT | -0.06 | 0.50 | 0.07 | -0.01 | 1.66 | 0.68 |
| B4 I ENJOY PLANNING WAY AHEAD | -0.04 | 0.36 | 0.10 | 0.07 | 1.53 | 0.70 |
| B5 IN GENERAL, I THINK IT IS IMPORTANT TO FOLLOW THE RULES | -0.08 | 0.49 | 0.04 | 0.00 | 1.92 | 0.54 |
| B6 TAKING CARE OF MY POSSESSIONS IS A HIGH PRIORITY FOR ME | 0.08 | 0.38 | 0.15 | 0.05 | 1.93 | 0.63 |
| B7 MY FAMILY AND FRIENDS WOULD SAY I HAVE TRADITIONAL VALUES | -0.05 | 0.48 | 0.05 | -0.03 | 1.84 | 0.72 |
| | | TO FIG. 3J | | | | |

FIG. 3J

| | | | | | | |
|---|---|---|---|---|---|---|
| B8 I TEND TO BE METICULOUS IN MY DUTIES | 0.10 | 0.35 | 0.24 | 0.04 | 1.72 | 0.66 |
| B9 I TEND TO BE CAUTIOUS, BUT NOT FEARFUL | 0.02 | 0.33 | 0.14 | 0.05 | 1.96 | 0.53 |
| B10 PEOPLE SHOULD BEHAVE IN WAYS THAT ARE MORALLY CORRECT | 0.04 | 0.42 | 0.09 | 0.08 | 2.08 | 0.63 |
| B11 IT IS IMPORTANT TO RESPECT AUTHORITY | -0.01 | 0.50 | 0.03 | 0.00 | 2.02 | 0.60 |
| B12 I WOULD RATHER HAVE LOYAL FRIENDS THAN INTERESTING FRIENDS | 0.02 | 0.33 | 0.08 | 0.09 | 2.25 | 0.67 |
| B13 LONG ESTABLISHED CUSTOMS NEED TO BE RESPECTED AND PRESERVED | 0.02 | 0.43 | 0.07 | 0.03 | 1.79 | 0.65 |
| B14 I LIKE TO WORK IN A STRAIGHTFORWARD PATH TOWARD COMPLETING THE TASK | -0.02 | 0.45 | 0.19 | -0.02 | 1.85 | 0.65 |
| D1 I UNDERSTAND COMPLEX MACHINES EASILY | 0.18 | 0.06 | 0.47 | -0.04 | 1.61 | 0.82 |
| D2 I PURSUE INTELLECTUAL TOPICS THOROUGHLY AND REGULARLY | 0.27 | 0.04 | 0.46 | 0.18 | 1.69 | 0.71 |
| D3 DEBATING IS A GOOD WAY TO MATCH MY WITS WITH OTHERS | 0.19 | 0.03 | 0.43 | 0.10 | 1.62 | 0.73 |

FIG. 3K

| | | | | | | |
|---|---|---|---|---|---|---|
| D4 I ENJOY COMPETITIVE CONVERSATIONS | 0.24 | 0.04 | 0.46 | 0.07 | 1.80 | 0.73 |
| D5 I AM INTRIGUED BY RULES AND PATTERNS THAT GOVERN SYSTEMS. | 0.14 | 0.12 | 0.46 | 0.08 | 1.55 | 0.71 |
| D6 I AM MORE ANALYTICAL AND LOGICAL THAN MOST PEOPLE | 0.17 | 0.15 | 0.50 | 0.06 | 1.77 | 0.75 |
| D7 I AM ABLE TO SOLVE PROBLEMS WITHOUT LETTING EMOTION GET IN THE WAY | 0.19 | 0.10 | 0.45 | -0.18 | 1.76 | 0.68 |
| D8 I LIKE TO FIGURE OUT HOW THINGS WORK | 0.25 | 0.11 | 0.53 | 0.07 | 2.08 | 0.68 |
| D9 I AM TOUGH-MINDED | 0.21 | 0.12 | 0.40 | 0.01 | 1.89 | 0.69 |
| D10 I HAVE NO TROUBLE MAKING A CHOICE, EVEN WHEN SEVERAL ALTERNATIVES SEEM EQUALLY GOOD AT FIRST | 0.16 | 0.11 | 0.32 | -0.13 | 1.55 | 0.70 |
| D11 WHEN I BUY A NEW MACHINE (LIKE A CAMERA, COMPUTER OR CAR), I WANT TO KNOW ALL OF ITS TECHNICAL FEATURES | 0.13 | 0.17 | 0.38 | 0.05 | 1.81 | 0.79 |

FROM FIG. 3J

| | | | | | |
|---|---|---|---|---|---|
| D12 I LIKE TO AVOID THE NUANCES AND SAY EXACTLY WHAT I MEAN | 0.17 | 0.14 | 0.34 | 0.01 | 1.93 | 0.68 |
| D13 I THINK IT IS IMPORTANT TO BE DIRECT | 0.21 | 0.15 | 0.37 | 0.10 | 2.10 | 0.56 |
| D14 WHEN MAKING A DECISION, I LIKE TO STICK TO THE FACTS RATHER THAN BE SWAYED BY PEOPLE'S FEELINGS | 0.11 | 0.23 | 0.41 | -0.11 | 1.72 | 0.67 |
| N1 I LIKE TO GET TO KNOW MY FRIENDS' DEEPEST NEEDS AND FEELINGS | 0.17 | 0.12 | 0.06 | 0.39 | 2.07 | 0.66 |
| N2 I HIGHLY VALUE DEEP EMOTIONAL INTIMACY IN MY RELATIONSHIPS | 0.18 | 0.18 | 0.10 | 0.38 | 2.34 | 0.63 |
| N3 REGARDLESS OF WHAT IS LOGICAL, I GENERALLY LISTEN TO MY HEART WHEN MAKING IMPORTANT DECISIONS | 0.17 | 0.06 | -0.05 | 0.33 | 1.89 | 0.71 |
| N4 I FREQUENTLY CATCH MYSELF DAYDREAMING | 0.13 | -0.07 | 0.00 | 0.46 | 1.84 | 0.74 |
| N5 I CHANGE MY MIND EASILY | 0.07 | -0.09 | -0.14 | 0.25 | 1.41 | 0.66 |
| N6 AFTER WATCHING AN EMOTIONAL FILM, I OFTEN STILL FEEL MOVED BY IT SEVERAL HOURS LATER | 0.09 | 0.07 | -0.05 | 0.45 | 1.80 | 0.73 |

FROM FIG. 3K

TO FIG. 3M

FROM FIG. 3L

| | | | | | | |
|---|---|---|---|---|---|---|
| N7 I VIVIDLY IMAGINE BOTH WONDERFUL AND HORRIBLE THINGS HAPPENING TO ME | 0.09 | -0.01 | 0.06 | 0.41 | 1.74 | 0.79 |
| N8 I AM VERY SENSITIVE TO PEOPLE'S FEELINGS AND NEEDS | 0.14 | 0.18 | -0.03 | 0.41 | 2.23 | 0.63 |
| N9 I OFTEN FIND MYSELF GETTING LOST IN MY THOUGHTS DURING THE DAY. | 0.12 | -0.05 | 0.02 | 0.48 | 1.70 | 0.73 |
| N10 I FEEL EMOTIONS MORE DEEPLY THAN MOST PEOPLE. | 0.14 | 0.12 | -0.01 | 0.53 | 1.83 | 0.77 |
| N11 I HAVE A VIVID IMAGINATION. | 0.33 | -0.04 | 0.20 | 0.43 | 2.09 | 0.70 |
| N12 WHEN I WAKE UP FROM A VIVID DREAM, IT TAKES ME A FEW SECONDS TO RETURN TO REALITY | 0.15 | -0.05 | 0.02 | 0.42 | 1.66 | 0.77 |
| N13 WHEN READING, I ENJOY IT WHEN THE WRITER TAKES A SIDETRACK TO SAY SOMETHING BEAUTIFUL OR MEANINGFUL | 0.16 | 0.07 | 0.06 | 0.35 | 1.77 | 0.70 |
| N14 I AM VERY EMPATHETIC | 0.17 | 0.09 | -0.01 | 0.39 | 2.11 | 0.66 |

FIG. 3M

"INTERESTED IN YOU" COMPONENT

| NEW MATCHES | NEW MATCHES |
|---|---|
| TODD | BROOKE |
| 1. MARSHELL | 1. JAY |
| ✗ 2. BROOKE | 2. THOMAS |
| 3. PAM | 3. CHRIS |
| 4. ALISA | 4. ALEX |
| 5. ALAINA | 5. KEVIN |
| 6. MICHELLE | 6. JIM |
| 7. ROSEANNE | 7. BILL |
| 8. DONNA | ✗ 8. TODD |
| 9. MARY | 9. BOB |
| 10. CANDACE | 10. CHET |

FIG. 5C

FIG. 6A chemistry

| Home | New Matches | My Profile | My Account | Interested in You | My Archives | Active Matches | Email |

Home  Help  Sign In

My Home | My Profile | My Personality Profile

Welcome to the Personality Profile

Fill in the basic information requested here, and then begin the Personality Profile where you'll find a series of fun, engaging and sometimes surprising questions.

Already a member? Sign In

First Name  [_____]  Why do we ask for your first name?

Username  [_____]

Password  [_____]

Confirm Password  [_____]

Email Address  [_____]

I am a  [Choose ▶]

Looking for a  [Choose ▶]

Your Birth Date  [Month ▶] [Day ▶] [Year ▶]

Country  [United States] [▶]

Zip/Postal Code  [_____]

chemistry

Home | New Matches | Interested in You | | |
My Home | My Profile | My Account | My Archives | |
| | | Active Matches | |
| | | My Personality Profile | |

Home  Help  My Profile  Archives  Sign Out

Email

Core Characteristics

In your family, which one are you?
- ○ Oldest child
- ○ Middle child
- ○ Youngest child
- ○ Only child When do you worry most about a major purchase?
- ○ It depends
- ○ Before making the purchase
- ○ While making the purchase
- ○ After making the purchase Describe yourself. To what degree are you:

FIG. 6B chemistry

| Home | New Matches | My Profile | My Account | Interested in You | My Archives | | Home | Help | My Profile | Archives | Sign Out |

Active Matches | My Personality Profile | Email

Universal Traits

To what degree are you:

| | A little | Quite a bit | Very much | Completely |
|---|---|---|---|---|
| Talkative | O | O | O | O |
| Enthusiastic | O | O | O | O |
| Outgoing | O | O | O | O |
| Helpful | O | O | O | O |
| Forgiving | O | O | O | O |
| Kind | O | O | O | O |
| Organized | O | O | O | O |
| Thorough in completing tasks | O | O | O | O |
| An efficient worker | O | O | O | O |
| Creative | O | O | O | O |
| A thinker | O | O | O | O |
| Interested in new experiences | O | O | O | O |
| Calm and relaxed | O | O | O | O |

FIG. 6G chemistry

Home | Help | My Profile | Archives | Sign Out

| Home | My Home | New Matches | My Profile | Interested in You | My Account | My Archives | Active Matches | My Personality Profile | Email |

More About Your Match

Which ethnic backgrounds are you willing to consider? Check all that apply.

☐ American Indian or Alaska Native   ☐ Native Hawaiian or other Pacific Islander
☐ Asian   ☐ White/Caucasian
☐ Black or African American   ☐ Other
☐ Hispanic/Latino or Spanish origin   ☐ Any
☐ Middle Eastern How important is this?   Not Important ——○———— Very important
                                    Somewhat Which religious affiliations are you willing to consider? Check all that apply.

☐ Agnostic   ☐ Hindu
☐ Atheist   ☐ Jewish

FIG. 6H chemistry

Home | New Matches | My Profile | Interested in You | Active Matches | Home Help My Profile Archives Sign Out
My Home | My Profile | My Account | My Archives | My Personality Profile | Email

Physical Fitness

Is exercise an important part of your daily routine, or something that you get around to every once in a while?

Step One: Use the About You slider to indicate how important physical fitness is in your life.

Step Two: Use the About Your Match slider to indicate the level of fitness you seek in your ideal partner.

Very Fit ←→ Not Fit
About You

Very Fit
↕
Not Fit
About Your Match

[ Save and Continue ▷ ]

FIG. 6J chemistry

Home | Help | My Profile | Archives | Sign Out

| Home | New Matches | Interested in You | Active Matches | Email |

Profile Summary | Full Profile | How We Match | Communications

How We Match

Assessing long-term compatibility is a complex task, but it starts with certain shared attitudes, values and background.

About You

YOUR MAJOR PERSONALITY TYPE: DIRECTOR
your minor personality type: explorer

About Liz

HER MAJOR PERSONALITY TYPE: EXPLORER
her minor personality type: negotiator

Characteristics of all four personality types can be found within each of us, but there is almost always one personality type that is dominant. We call this the major personality type. The chemistry assessment tool also identifies your minor, or secondary, personality type. You exhibit some aspects of your minor personality type, though not all of them, or to the same degree as with your major personality type.

FIG. 6K chemistry

| Home | New Matches | Interested in You | Active Matches | Email |

Home  Help  My Profile  Archives  Sign Out

You are a DIRECTOR/explorer

You are courageous; and you seek challenges. You are a tough-minded, independent and daring thinker who likes to explore ideas or problems thoroughly. You focus easily. And you are persistent, systematic and competent in pursuing your interests and goals.

You are also assertive; and you enjoy the opportunities your hard work wins.

You have a lot of energy. You think quickly, make decisions more easily than most, dislike unnecessary rules, and take a rational approach to people, issues and ideas.

You don't often enjoy "small talk". You are generally not interested in pleasing boring people and you gravitate to men and women who are intellectually exciting and get to their point quickly during conversations.

You are not conventional in most of your attitudes and values. You tend to be irreverant and pragmatic and you like spontaneous people. You can be an exciting, yet hard driving and exacting, friend and companion.

Liz is an EXPLORER/negotiator

Liz is a highly spontaneous person who likes to try new things. Novel and unpredictable situations don't bother her; instead Liz finds them challenging and exciting.

Liz tends to be focused and resourceful and is able to juggle a lot of projects at the same time; as a result Liz is sometimes a whirlwind of activity.

Liz has a firm grip on reality and enjoys living in the present tense. But Liz has a keen imagination that enables her to lift off from time and space and be remarkably creative.

Liz is humorous and likes entertaining others.

Liz has a deep sense of compassion and is able to show genuine insight into the needs of others; is good at listening and talking; and expresses a genuine desire to be helpful.

Yet Liz is easy-going. Her tolerance for others and their beliefs; her lack of prejudice; her ability to compromise and her occasional antics make Liz popular with others and a great companion.

FIG. 6L

| Home | Help | My Profile | Archives | Sign Out |

| Home | New Matches | Interested in You | Active Matches | Email |

Your Personality Traits: How You Complement Liz

The five personality traits featured below are generally accepted as the "Big Five", or traits that are common to all of us to some degree.

Take a look at how you and Liz compare in your responses.

Extravert

Friendly, talkative and outgoing. Often takes on leadership roles. Comfortable around others, especially large groups.

You
　　　　　　　　　　　　　　　　▽
　　[======================]
　　　　　　　　　　　　△
　　　　　　　　　　　　Liz

Agreeable

Easygoing in nature. Can be tolerant and accommodating of others. Interested in creating harmony and building consensus.

You
　　　　　　　　　▽
　　[======================]
　　　　　　　　　△
　　　　　　　　　Liz

Conscientious

Determined to meet or exceed stated goals. Disciplined and extremely focused at work. Not easily distracted.

You
　　　　　　　　　　　　　　　　　　　　　　　▽
　　[======================]
　　　　　　　　　　　　　　　　△
　　　　　　　　　　　　　　　　Liz

Open to New Experiences

Interested in innovation, experimentation and new solutions. Willing to try new experiences. Creative, original thinker.

You
　　　　　　　　　　　　　　　　　　　　　　▽
　　[======================]
　　　　　　　　　　　　　　　　　　　　　△
　　　　　　　　　　　　　　　　　　　　　Liz

Emotional Stability

Strong and steady, not easily upset. Level-headed in response to unforeseen changes or problems. Calm, cool and collected.

You
　　　　　　　　　　　▽
　　[======================]
　　　　　　　　　　　△
　　　　　　　　　　　Liz

FIG. 6N

Select Your Relationship Essentials
Select FIVE characteristics that are IMPORTANT for you to find in a long-term partner, and then use the slider at the right to indicate precisely how IMPORTANT each item is.

| Important | Statement | Importance Level | |
|---|---|---|---|
| ☑ | Shares feelings and emotions on a daily basis. | Not Important ⎯⎯⎯◯⎯⎯⎯ | Important |
| ☑ | Finds humor to be a key ingredient for life. | Not Important ⎯⎯⎯◯⎯⎯⎯ | Important |
| ☑ | Depends heavily on their partner. | Not Important ⎯⎯⎯◯⎯⎯⎯ | Important |
| ☑ | Is highly creative. | Not Important ⎯⎯⎯⎯◯⎯⎯ | Important |
| ☑ | Is very very well educated. | Not Important ⎯⎯⎯◯⎯⎯⎯ | Important |

FIG. 6O

| | | | |
|---|---|---|---|
| ☐ | Always resolves arguments. | Not Important ⎯⎯⎯⎯⎯⎯ | Important |
| ☐ | Is very physically attractive. | Not Important ⎯⎯⎯⎯⎯⎯ | Important |
| ☐ | Is extremely clean and neat. | Not Important ⎯⎯⎯⎯⎯⎯ | Important |

FIG. 6P

SYSTEM AND METHOD FOR PROVIDING ENHANCED MATCHING BASED ON PERSONALITY ANALYSIS

TECHNICAL FIELD OF THE INVENTION

This invention relates in general to the field of communications and, more particularly, to a system and a method for providing enhanced matching based on personality analysis.

BACKGROUND OF THE INVENTION

Networking architectures have grown increasingly complex in communications environments. Many of these architectures have gained significant notoriety because they can offer the benefits of automation, convenience, and data management for their respective online communities. Certain network protocols may be used in order to allow an end user to conduct online searches, for example, for candidates to fill a given vacancy. These protocols may relate to job searches, person-finding services, real estate searches, or online dating.

While some naive business people may believe that online dating is simply a matter of matching supply and demand, there is statistical and empirical evidence to suggest that successful online dating entails far more. For example, people having similar and/or compatible character traits and values should be matched together. Along a similar line of reasoning, end users should be matched based on their personality type. However, effectively linking two participants together can prove to be a challenging endeavor.

These matching decisions need to be carefully managed by an administrator in order to achieve a suitable level of satisfaction from customers. Systems that fail to account for compatibility issues and/or personality types can mislead their customers, frustrate their clients, and waste the time of all those involved. Accordingly, the ability to provide effective mechanisms and features for optimally matching in an online community offers a significant challenge to website operators, component manufacturers, and system designers alike.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which:

FIGS. 2A-B are simplified screen shots of an example profile to be used in the online dating service;

FIGS. 3A-C are simplified screen shots involving an example personality profile to be used in the online dating service;

FIGS. 3D-M are simplified diagrams and statistical illustrations that depict some of the personality identification techniques and resultants of example embodiments of the present invention;

FIG. 5C is an example schematic that shows how the "Interested In You" component can operate in one implementation.

DETAILED DESCRIPTION OF EXAMPLE EMBODIMENTS

Overview

In one example embodiment, a method is provided that includes interfacing with one or more end users via a central website and managing information related to one or more of the end users. The method also includes determining a personality type for one or more end users and matching end users based on relationship rules of the personality types that outline compatibilities between the personality types. In more specific embodiments, the determining of the personality type includes an evaluation of a hand of a selected end user. The personality types can be based on inferred levels of testosterone, serotonin, or estrogen. The personality type determination can also be made based on a set of questions. The personality type determination can also be based on evaluating a selected end user's word choice and/or the frequency in their word choice in their writing.

Figure 1:
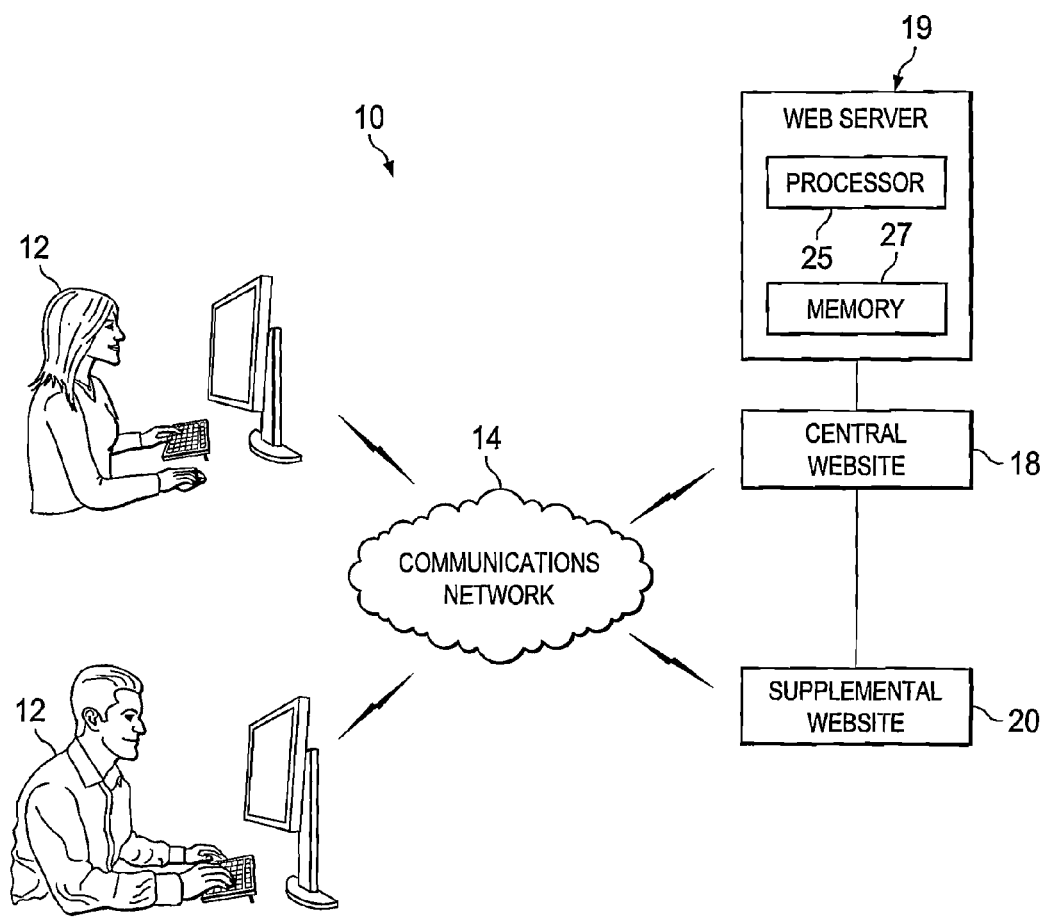
FIG. 1 is a simplified block diagram of a system for providing an online dating service in accordance with one embodiment of the present invention.

FIG. 1 is a simplified block diagram of a system 10 for facilitating an online dating scenario in a network environment. In other embodiments, system 10 can be leveraged to identify and to evaluate suitable candidates in other areas (e.g., hiring/employment, recruiting, real estate, general person searches, etc.). FIG. 1 includes multiple end users 12, a communications network 14, a central website 18 (which can include a web server 19 that could potentially include a processor 25 and a memory 27), and a supplemental website 20 (which could include similar hardware [a processor and memory]). FIG. 1 may be configured such that inter and intra-communications are readily achieved by any of the components included therein. The present invention is capable of providing both an online component (as illustrated by FIG. 1) and an off-line component (as described below) such that one or more end users can meet, gather information, resolve to meet, and then subsequently meet in person with the assistance of system 10. Ancillary components to such a comprehensive process may involve pre-date profiles, post-date follow-ups, and a myriad of other significant features, as outlined in detail below.

System 10 can be used to offer a multitude of unique features and capabilities to a group of end users. A brief summary of some of these features is offered immediately below. Additional details relating to each of these tools is discussed more fully with reference to the accompanying FIGURES.

A first feature provided by system 10 relates to intelligently matching based on personality type identification. Statistically, personality types will respond differently to a given question (or a set of questions). In particular examples, as detailed below, questions are being used by system 10 (e.g., an administrator of system 10) to solicit important end user feedback that will be used to enhance the matching process. As a separate feature, but similarly powerful tool, personality types routinely use certain words to express themselves. A statistical correlation has been found between users expressing themselves with selected words and their individual personality types. Thus, system 10 can leverage this knowledge and conduct evaluations to interpret a person's word choice in gleaning insight into their specific personality types. Once the personality type is accurately identified, then relationship rules may be employed/accessed to attempt to connect two end users.

In one example set of relationship rules, Explorers are attracted to other Explorers, Negotiators are attracted to Negotiators, while Directors are attracted to Builders and vice versa. [Each of these individual personality types is explained in detail below.] These relationship rules, which are addressing general compatibility findings, can be used to better position end users in circumstances in which they are more likely to succeed. In terms of a more specific example (such as online dating), these attraction patterns allow for better matching between individuals. Furthermore, the personality determination can be used in conjunction with profile information (potentially inclusive of end user preferences) to connect two or more end users in an ideal fashion. Furthermore, an administrator is afforded the ability to weight these components (profile, personality determination, end user preferences, etc.) in order to refine the matching process.

A second feature provided by system 10 relates to multi-tiered questions. Along the dating continuum, several levels of questions are proffered for the end user. During the unique questioning protocol, preferred answers are selected by one candidate and then the other potential candidate receives the questions that include these answers. The questions/stages can be completed in pairs. The results are then displayed in a novel way, whereby selections from one candidate are illustrated along with the other candidate's responses. This scale (or seesaw configuration) readily displays the differences, the range of differences, and/or the congruency in the answers. Note that the "Not Interested" bar is displayed throughout the dating process such that the end user can exit the romantic pursuit at any given time. The discussion of this second feature is amenable to detailed illustrations, which are discussed below.

A third feature provided by system 10 relates to a resolution to a meeting. Lacking in most system is any method for facilitating a meeting after the first three stages of interaction have been finished. System 10 addresses this void by offering a pre-date profile for the participants to complete. Optimal date, time, cuisine, and other preferences can be solicited from both parties. Once a mutually agreeable date has been planned, the parties are invited to meet at the proposed time, place, and location. In a particular embodiment, during the course of the date, a courtesy phone call may be placed to either of the participants (or a specific participant at their request) in order to indicate that the date has ended. Note that a first date may only be for coffee; so once the allotted time has passed, the meeting should conclude. In another embodiment, such a call could be used to provide a graceful exit for a party who is experiencing an uncomfortable situation.

A fourth feature provided by system 10 relates to a post-date evaluation. Once the date is completed, the parties can return to the site and fill out a post-date follow up evaluation. This may be inclusive of questions that relate to appearance, punctuality, chemistry, etc. A sampling of these questions is provided and discussed below with reference to corresponding FIGURES. A second date solicitation could also readily be provided at this point along the dating timeline. Additionally, a dating report card could be provided to each of the end users. This could be done in order to provide benign, constructive feedback to an end user, who may be experiencing difficulty in one particular facet of his dating approach (e.g., the end user may be counseled to focus on being a better listener).

A fifth feature provided by system 10 relates to an "Interested in You" component. The "Interested in You" component is broken into two segments: 1) Match List; and 2) Interested in You. Other online dating platforms simply populate matches concurrently. In the architecture of system 10, the interest level is separated from the "want to meet" element. The other candidate only receives an e-mail if the interest level is positive (e.g., greater than 7 [scale 1-10]). Negative interest levels are not communicated to the other potential match. These functionalities can be better understood with reference to accompanying illustrations and the discussions that are provided below.

A sixth feature provided by system 10 relates to a limited search, which can be conducted by a participant. The limited search may be somewhat constricted (e.g., only one limited search per day). The limited search capability would allow an end user to seek out individuals having an exact qualification or a specific characteristic. This would achieve a level of granularity for the end user, who may have precise criteria for choosing a romantic interest to pursue. Additional platform tools, capabilities, and features are provided below and are discussed with reference to accompanying FIGURES. These elements are described immediately following the subsequent description of the components of the architecture of FIG. 1.

A seventh feature provided by system 10 relates to a "Level of Interest Rating." An end user is provided with a web prompt (e.g., a slider bar), which solicits the end user's interest level of a potential candidate. The scale can range from "No Interest" to "High Interest" or system 10 can use any other gradation where appropriate. Such an interest-ometer stands in stark contrast to other rudimentary systems in which a simple match is generated based on profile information. Moreover, prior architectures process according to strict compatibility, but fail to accommodate the interest component. Consider the case where a person's profile information would suggest one potential mate, but their interest bar resultants yield an attraction to a completely different type of individual. System 10 effectively accounts for such a discrepancy (and others) in offering a superior method of matching two individuals.

The indicated interest can be sent to system 10 and, further, be used in additional processing for this end user. In such a scenario, feedback from the interest bar can be aggregated, compiled, and processed for the future coordination of potential matches. Hence, a reevaluation protocol is facilitated by continuing to leverage results from the interest bar.

Turning back to the infrastructure of FIG. 1, end users 12 are clients, customers, prospective customers, or entities wishing to participate in an online dating scenario and/or to view information associated with other participants in the system. End users 12 may also seek to access or to initiate a communication with other users via communications network 14. End users 12 may review data (such as profiles for example) associated with other users in order to make matching decisions or elections. Data, as used herein in this document, refers to any type of numeric, voice, video, or script data, or any other suitable information in any appropriate format that may be communicated from one point to another.

In one embodiment, end user 12 represents (and is inclusive of) a personal computer that may be used to access the Internet. Alternatively, end user 12, as illustrated in FIG. 1, may be representative of a cellular telephone, an electronic notebook, a laptop, a personal digital assistant (PDA), or any other suitable device (wireless or otherwise: some of which can perform web browsing), component, or element capable of accessing one or more elements within system 10. An end user interface, which may be provided in conjunction with the items listed above, may further comprise any suitable interface for a human user such as a display, a video camera, a microphone, a keyboard, a mouse, or any other appropriate terminal equipment according to particular configurations and arrangements. In addition, the end user interface may be a unique element designed specifically for communications involving system 10. Such an element may be fabricated or produced specifically for matching applications involving end user 12.

Communications network 14 is a communicative platform operable to exchange data or information emanating from end user 12. Communications network 14 represents an Internet architecture in a particular embodiment of the present invention, which provides end user 12 with the ability to electronically execute or to initiate actions associated with finding a potential candidate. Alternatively, communications network 14 could be a plain old telephone system (POTS), which end user 12 could use to perform the same operations or functions. Such transactions may be assisted by management associated with central website 18 or manually keyed into a telephone or other suitable electronic equipment. In other embodiments, communications network 14 could be any packet data network (PDN) offering a communications interface or exchange between any two nodes in system 10. Communications network 14 may alternatively be any local area network (LAN), metropolitan area network (MAN), wide area network (WAN), wireless local area network (WLAN), virtual private network (VPN), intranet, or any other appropriate architecture or system that facilitates communications in a network or telephonic environment.

Central website 18 is a server (in one embodiment [e.g., web server 19]) that is operable to receive and to communicate information to end user 12. Alternatively, central website 18 may be any switch, router, gateway, processor, component, object, or element operable to facilitate communications involving end user 12. In one particular embodiment, central website 18 is engaged in facilitating interaction(s) between parties interested in seeking a romantic partner (i.e. online dating). For example, central website 18 can be online dating service provider www.Match.com. In other embodiments, central website 18 is any website or architecture interested in facilitating a connection involving two or more people, and which may make use of a given photograph. This could include services associated with job placements, escort services, real estate, recruiting services (e.g., in athletics or in academic settings), etc.

Supplemental website 20 is a server (in one embodiment) that is operable to receive and to communicate information to end user 12. Alternatively, supplemental website 20 may be any switch, router, gateway, processor, component, object, or element operable to facilitate communications involving end user 12. In one particular embodiment, supplemental website 20 is operable to perform processing functions for central website 18. For example, supplemental website 20 can be used to coordinate scheduling, execute matching algorithms, assist in uploading or downloading large pieces of data, implement billing protocols for end users, etc. Supplemental website 20 can alleviate any of the processing loads present in the network.

A link may be provided on either central website 18 or supplemental website 20 (or on both) such that a given end user can be immediately directed to the other site. While one embodiment offers a connection between these two sites, these two sites may be completely independent of each other in other embodiments, where independent entities operate these sites. In the case that these two sites are operable to communicate with each other, a secure connection can be provided in order to maintain the integrity of the information propagating between the sites and to protect the privacy of the individuals implicated by the communications.

With regard to the specific items that effectuate the teachings of the present invention, central website 18 and/or supplemental website 20 may include software and/or algorithms to achieve the operations for processing, communicating, delivering, gathering, uploading, maintaining, and/or generally managing data, as described herein. This includes suitably displaying some or all of these items. Alternatively, such operations and techniques may be achieved by any suitable hardware, component, device, application specific integrated circuit (ASIC), additional software, field programmable gate array (FPGA), server, processor, algorithm, erasable programmable ROM (EPROM), electrically erasable programmable ROM (EEPROM), or any other suitable object that is operable to facilitate such operations.

Considerable flexibility is provided by the structure of central website 18 and supplemental website 20 in the context of system 10. Thus, it can be easily appreciated that such functions could be provided external to central website 18 and supplemental website 20. In such cases, such a functionality could be readily embodied in a separate component, server, processor, device, or module. Note that these online dating features and capabilities may be provided in just one of these elements, in both, or distributed across both of them. Hence, in certain embodiments, the online dating operations may be consolidated in a single website, where no redirection is needed, nor performed for the user.

In one example, software that resides in web server 19 within central website 18 is executed by processor 25 (potentially in conjunction with memory 27) to make personality determinations based on harvested data, which could be stored in any type of memory or database. Such a determination could also be developed externally and then uploaded to web server 19 (i.e. central website 18). In addition, this software includes an algorithm that factors in not only personality determinations, but that also incorporates profile information along with end user preferences to make (and/or) to serve up intelligent matching decisions for an online community. An administrator of some kind may further accord weights to each of these components in order to connect individuals who would most likely achieve a successful relationship. This could pertain to job searching functions, online dating, or any other type of person-matching or person-finding operations. In a similar fashion, the software can comprehend word choice decisions by the end users in the online community and make further recommendations (or aid in identifying personality types) based on the specific usage of words and/or their frequency of usage. Furthermore, the software can infer various levels of chemicals (e.g., testosterone, estrogen, serotonin, etc.) of the end user based on responses to questions.

In operation of an example flow, consider a case where a given end user is interested in participating in an online dating scenario. End user 12 can access the Internet, travel to central website 18, register, and create a profile on the site. Note that end user 12 may access supplemental website 20 directly as well. Moreover, end user 12 can access either website through any suitable banner, pop-up, partnership, e-mail solicitations, direct mailings, etc. It can be appreciated that online commerce can be generated by a plethora of marketing tools and any such tools can readily cooperate with the operations of the present invention.

From this point, matching (of any form) can commence amongst the members of the online community. For example, in the context of a romantic endeavor, a person may begin the dating process or engage in communications that would spawn such dating. Other applications could include job applicants who are being sought by employers. Any of the individuals who reside in the online community can begin using any of the tools or capabilities of the platform.

FIGS. 2A-B are simplified screen shots of an example profile to be used in the online communications platform. It is imperative to note that these illustrations (and subsequently FIGURES) are only being provided to further outline a particular implementation of the present invention. In no way should these diagrams be used to limit or to restrict the broad teachings of the present invention. Such illustrative information has been offered earnestly and, thus, should not be construed to confine the broad applications of the present invention.

The profile includes information that was solicited from this end user ("Todd") when he set up his online dating account. The profile includes general information (e.g., address, height, weight, etc.), as well as a segment that reflects some of Todd's personal feelings or his outlook on the world. This information in these two FIGURES is only a profile summary, whereby a full profile can be stored within system 10 at a different location.

Note the level of interest rating component to FIG. 2A. An interest level slider bar is used by the end user in order to make selections or designations about potential dating candidates. The slider bar is easy to use and can solicit the end user's thoughts about a prospective mate. (Note that such a slider bar is simply a graphical illustration that simplifies the end user's experience. Other graphical illustrations may include (but not be limited to), a knob, a bar-graph representation, or any other chart, symbol, picture, illustration, or object capable of displaying an end user's interest level.) The level of interest bar is conducive to an expedient disposal of individuals that offer minimal intrigue to the end user. In a similar fashion, the level of interest bar can readily be utilized in order to initiate the next step in the dating process.

If the slider is moved to the right (indicating a strong preference for this particular individual), then the person can be moved to an "Active Matches" tab (i.e. a queue), where the relationship progresses to the next level. If the slider is moved to the left (indicating a low level of interest in this individual), then this person can be placed into an "Archive" where the relationship does not continue. Note that an inference can be made based on the level of the slider bar such that a potential candidate can be immediately directed to an end user's active matches. In other embodiments, there is no default to "Active Matches" and the end user must manually make this decision: no matter his level of interest rating. For example, a simple prompt may be provided to the end user such that, for a proffered candidate, the end user makes an election (e.g., by clicking his mouse to make a selection) for "Active Matches" or "Archive."

The slider bar represents an easy way for an end user to engage in the candidate selection process. Engagement could yield a progression toward a future relationship or it could remove individuals from consideration from an end user's queue. Both of these actions are productive, as both are results-oriented. Deciding not to engage a certain individual is certainly useful, as choices associated with an end user's dislikes are valuable for identifying and proffering new candidates. This feedback information is imperative to achieving a high level of success in an online dating environment.

It should be noted that the present invention does utilize some technology previously applied for by Applicant. Note that the following related case is hereby incorporated by reference: System and Method for Providing Enhanced Questions for Matching in a Network Environment; Ser. No. 11/237,491, filed Sep. 27, 2005.

Figure 3A:
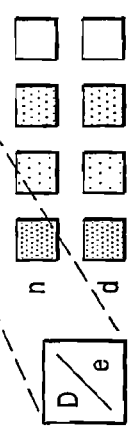
Figure 3B:
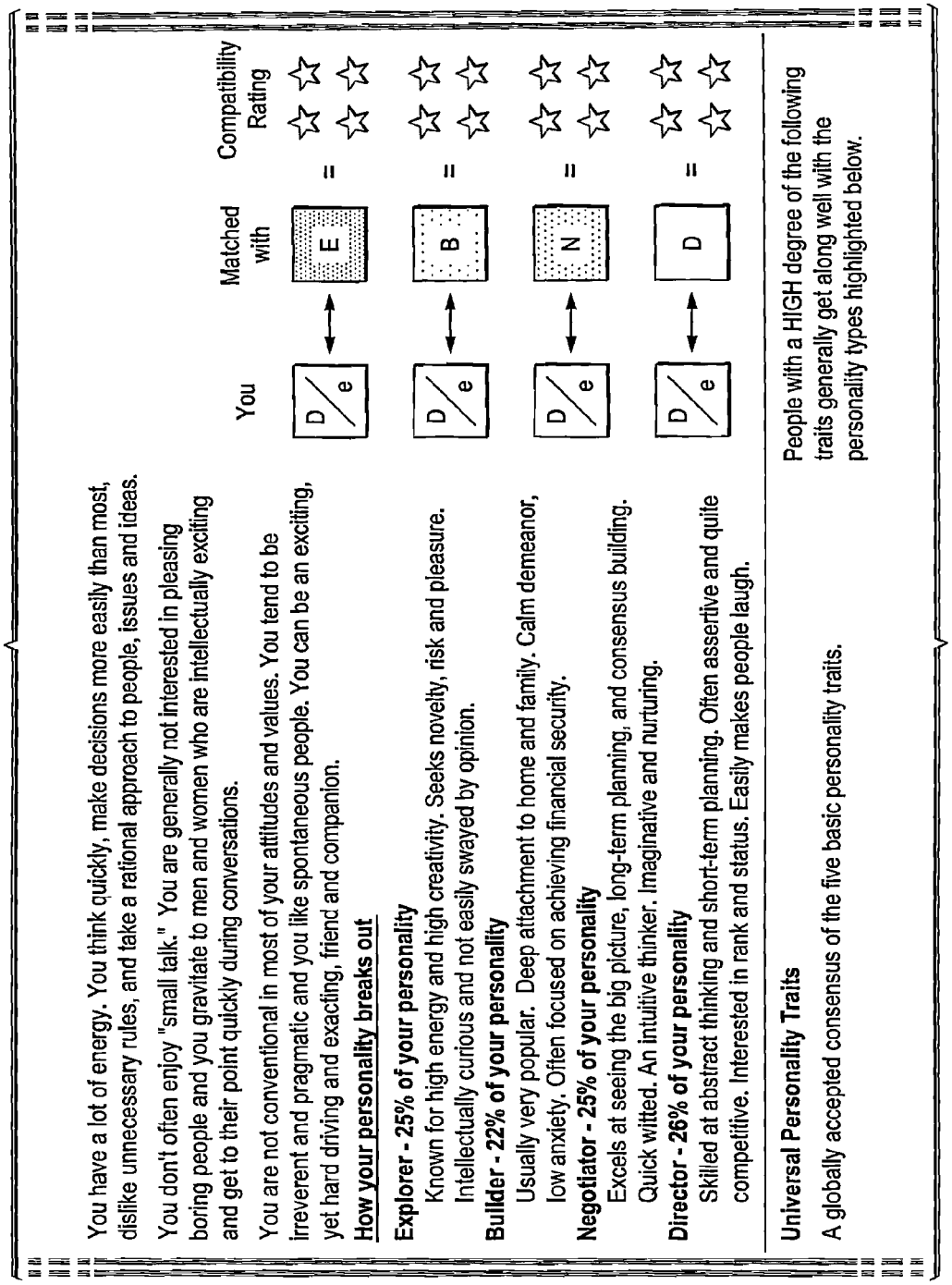

FIGS. 3A-C are simplified screen shots involving an example personality profile to be used in the online communications platform. The personality profile reflects a series of fun, probing questions that get to the heart of who the end user is, and what the end user seeks or needs. The personality profile explores the complex mix of values, traits, and attitudes that are included in the unique identities and relationship needs for a given group of end users. At the conclusion of the personality profile process, the end user can receive a detailed analysis of their personality profile and a guide to the personality types with whom the end user is most compatible.

In the context of the particular example of FIGS. 3A-C, a given end user's personality profile is illustrated. Hence, this end user (Todd) has completed a questionnaire that revealed his personality type (e.g., Director, Explorer, Builder, Negotiator, etc.). The answers to these questions can create a profile or "love map." For example, Todd is designated as having a major personality type of Director and a minor personality type of Explorer. The responses from Todd are used to match him to potential mates based on the compatibility or congruency in their traits, as reflected by the results of the test.

Consider the case where congruency is not necessarily optimal in the context of a dating scenario. Todd may be extroverted and excessively social, but if his mate shared this character trait, this situation may be unworkable. Character traits may have complimentary effects, whereby strict commonality would not always produce an ideal relationship connection. In other embodiments, the personality profile of FIGS. 3A-C is displayed to the end user concurrently with the personality profile of a potential candidate. Using such a comparison/contrast format, the end user could readily see how his interests and character traits are aligned or dissimilar.

Characteristics of all four personality types can be found within each person, but there is usually one personality type that is dominant. This is called the major personality type. The test (some of which is reflected by FIGS. 3H-3M) also identifies minor or secondary personality types. An end user may exhibit some aspects of this personality type, though not to the same degree as with the major personality type. In the context of Todd's personality profile, a pie chart is illustrated to signify his personality makeup. The analysis is based on his responses to a questionnaire provided by system 10. The results here identify Todd's major and minor personality types, as well as the personality types that are most likely to be compatible with his personality. This represents a flavor of the 'relationship rules' as outlined herein. Other formatting of these relationship rules may be more concise: indicating Directors should be matched with Builders, etc. (as further outlined below).

In this instance, Todd's major personality type=Director and his minor personality type=Explorer. Hence, Todd is a DIRECTOR/explorer, which (in the narrative) indicates: "You are courageous; and you seek challenges. You are a tough-minded, independent, and daring thinker who likes to explore ideas or problems thoroughly. You focus easily. In addition, you are persistent, systematic and competent in pursuing your interests and goals. You also assertive; and you enjoy the opportunities your hard work wins. You have a lot of energy. You think quickly, make decisions more easily than most, dislike unnecessary rules, and take a rational approach to people, issues and ideas. You do not often enjoy "small talk." You are generally not interested in pleasing boring people and you gravitate to men and women who are intellectually exciting and get to their point quickly during conversations. You are not conventional in most of your attitudes and values. You tend to be irreverent and pragmatic and you like spontaneous people. You can be an exciting, yet hard driving and exacting, friend and companion."

In addition, in this example Todd is E—Explorer—25%, N—Negotiator—25%, B—Builder—22%, and D—Director—26%. [The percentages do not necessarily sum to 100%.] The Explorer element of his personality is known for high energy and high creativity. Explorers seek novelty, risk, and pleasure. In addition, Explorers are intellectually curious and not easily swayed by opinion. Todd is also 22% Builder. These Builder individuals are usually popular and have a deep attachment to home and family. Builders exhibit a calm demeanor and low anxiety, and are often focused on achieving financial security. Todd is also 25% Negotiator. A Negotiator excels at seeing the big picture, long-term planning, and consensus building. Negotiators are quick witted and intuitive. These individuals are also imaginative and nurturing. Finally, Todd is 26% Director. These individuals are skilled at abstract thinking and short-term planning. Directors are often assertive, competitive, and interested in rank and status. Directors are known for easily making people laugh.

Note that any segment of the test of FIGS. 3A-C can include a Myers Briggs portion for the end user to complete. A Myers Briggs test would reveal some personality traits, which may be beneficial to matching two compatible individuals. Other personality tests could similarly be used in this area of the platform and, thus, are within the broad scope of the present invention.

Figure 3D:

FIG. 3D is a 'Relative Length of Index vs. Ring Finger' depiction, categorized by personality type. The subsequent illustration, FIG. 3E, shows the percent with 'Longer Ring Finger by Personality Type.' Data such as this can aid an administrator of central website 18 in accurately identifying a personality type. After gathering this preliminary data about a person's hand (or other anatomical features), fundamental knowledge about which personality types match best together can be employed to serve up better matches for a given group of end users. FIGS. 3F-3G simply illustrate statistical results of many of these attributes: specifically a means and a percent statistical distribution for these elements, respectively.

FIGS. 3H-3M collectively illustrate a statistical analysis of Alphas of a given question set. Note that in many cases, personality types will respond differently to given question(s). The questions of FIGS. 3H-3M offer one format for questions but there are more types of questions available. For example, one type/form of question may be asking the end user about a picture shown to the end uses, querying whether the end user believes that this particular snapshot portrays a smile that is either genuine or artificial. An Explorer would typically respond in a different manner than a Negotiator (even though they are viewing the same picture) and there is a statistical correlation that validates this personality discernment resultant.

Part of this investigation is testing the ability of a given end user to accurately interpret a smile. Part of this response may also be revealing levels of serotonin, testosterone, and estrogen of the end user who is responding. In this particular example, a picture (along with a question) is being used to solicit important end user feedback that will be used to enhance the matching process.

In other scenarios, only a question (or set of questions), without an accompanying picture, can be used to accurately identify a personality type. A number of questions have been statistically validated in this fashion: some of which are shown in FIGS. 3H-3M. The abbreviations before each question number represent the personality type options (Explorer, Builder, Director, and Negotiator). The bolded portions in FIGS. 3H-3M show a stronger/higher correlation. The spreadsheet of FIGS. 3H-3M demonstrate the characteristics of each item. It further shows how each item correlates with its own scale (with the item itself removed), as well as how it correlates with the other scales. One key point is that each item clearly correlates better with its own scale than with the other three scales. The two right columns show the average (mean) response to each item (with 0-3 being the possible range).

Note that the following list of questions (repeated below for illustrative purposes) offers an example set of questions for an administrator to employ in making a personality type determination. These questions are far from exhaustive and, further, each can readily be modified, added to, deleted, etc. without departing from the scope of the present invention. In this non-limiting example, the question set(s) include:

E1 I find unpredictable situations exhilarating.
E2 I do things on the spur of the moment.
E3 I get bored when I have to do the same familiar things.
E4 I have a wide range of interests.
E5 I am more optimistic than most people.
E6 I am more creative than most people.
E7 I am always looking for new experiences.
E8 I am always doing new things.
E9 I am more enthusiastic than most people.
E0 I am willing to take risks to do what I want to do.
E11 I get restless if I have to stay home for any length of time.
E12 My friends would say I am very curious.
E13 I have more energy than most people.
E14 On my time off, I like to be free to do whatever looks fun.
B1 I think consistent routines keep life orderly and relaxing.
B2 I consider (and reconsider) every option thoroughly before making a plan.
B3 People should behave according to established standards of proper conduct.
B4 I enjoy planning way ahead.
B5 In general, I think it is important to follow the rules.
B6 Taking care of my possessions is a high priority for me.
B7 My family and friends would say I have traditional values.
B8 I tend to be meticulous in my duties.
B9 I tend to be cautious, but not fearful.
B10 People should behave in ways that are morally correct.
B11 It is important to respect authority.
B12 I would rather have loyal friends than interesting friends.
B13 Long established customs need to be respected and preserved.
B14 I like to work in a straightforward path toward completing the task.
D1 I understand complex machines easily.
D2 I pursue intellectual topics thoroughly and regularly.
D3 Debating is a good way to match my wits with others.
D4 I enjoy competitive conversations.
D5 I am intrigued by rules and patterns that govern systems.
D6 I am more analytical and logical than most people.
D7 I am able to solve problems without letting emotion get in the way.
D8 I like to figure out how things work.
D9 I am tough-minded.
D10 I have no trouble making a choice, even when several alternatives seem equally good at first.
D11 When I buy a new machine (like a camera, computer or car), I want to know all of its technical features.

D12 I like to avoid the nuances and say exactly what I mean.
D13 I think it is important to be direct.
D14 When making a decision, I like to stick to the facts rather than be swayed by people's feelings.
N1 I like to get to know my friends' deepest needs and feelings.
N2 I highly value deep emotional intimacy in my relationships.
N3 Regardless of what is logical, I generally listen to my heart when making important decisions.
N4 I frequently catch myself daydreaming.
N5 I change my mind easily.
N6 After watching an emotional film, I often still feel moved by it several hours later.
N7 I vividly imagine both wonderful and horrible things happening to me.
N8 I am very sensitive to people's feelings and needs.
N9 I often find myself getting lost in my thoughts during the day.
N10 I feel emotions more deeply than most people.
N11 I have a vivid imagination.
N12 When I wake up from a vivid dream, it takes me a few seconds to return to reality.
N13 When reading, I enjoy it when the writer takes a sidetrack to say something beautiful or meaningful.
N14 I am very empathetic.

Armed with this important information, which better identifies personality types, a given administrator can position end users in ideal scenarios. This could include online dating scenarios, or assigning work responsibilities, in hiring individuals, or in general allocation decisions that involve people.

As a separate matter, but involving a similarly powerful tool, it has been found that personality types routinely use certain words to express themselves. A statistical correlation has been found between users expressing themselves with selected words and their individual personality types. For example, a subset of words routinely used by a specific personality type could involve twenty words: meaning that for a given personality type, these are the most commonly and/or most frequently used words. This finding offers a valuable metric for areas such as online dating, or resume evaluations or any other area in which a person's word choice is being studied to glean insight into their personality types.

With reference to an example that pertains to online dating, end user profiles could be mined or searched. Specifically, any Essay data or "Headline" information, where the end user was solicited to express themselves in writing, could be analyzed. [Note that in cases where there is not an Essay present, end users can simply be asked to provide a writing sample.] Those profiles could be compared to the word sets (e.g., twenty words most frequently used by a given personality type) to discern personality types. Once individuals are labeled by their personality types, then they can be better matched to one another. Fundamental correlations between personality types can be accessed to aid in connecting appropriate personality types.

In one example set of personality relationship rules, Explorers are attracted to other Explorers, Negotiators are similarly attracted to other Negotiators, while Directors are attracted to Builders and vice versa. These relationships can be leveraged by an administrator (and by the actual algorithms) to better position end users in circumstances where they are more likely to succeed. In terms of a more specific example (such as online dating), these attraction patterns allow for better matching between individuals.

Turning to a granular example that offers a tangible calculation (based on a given sample size, confidence interval, etc.), an initial sample was evaluated and it consisted of 29,731 gay and heterosexual participants (645 gay men, 120 gay women, 18,238 heterosexual men, 10,728 heterosexual women). The following variables were available for each participant:
Participant's gender
Participant's type (Builder, Director, Explorer, Negotiator)
Type of the participant's first date
Participant's sexual orientation (gay, heterosexual)
Participant's rating of the first date (positive/negative)

With particular reference to the online dating environment, the date ratings were distributed as follows: 3% "Negative", 13% "Positive", and 84% did not give any rating.

For this particular analysis, heterosexuals were selected, and those giving a "Negative" date rating were eliminated. This left 28,128 participants (17,776 M, 10,352 F). The table below shows the number of participants for each combination of participant and date's personality type:

|  |  | Male Date's Type | | | | |
|---|---|---|---|---|---|---|
|  |  | Builder | Director | Explorer | Negotiator | Total |
| Female Participant's Type | Builder | 1,551 | 1,113 | 421 | 812 | 3,897 |
|  | Director | 828 | 730 | 248 | 619 | 2,425 |
|  | Explorer | 526 | 440 | 193 | 338 | 1,497 |
|  | Negotiator | 852 | 847 | 239 | 595 | 2,533 |
|  | Total | 3,757 | 3,130 | 1,101 | 2,364 | 10,352 |

|  |  | Female Date's Type | | | | |
|---|---|---|---|---|---|---|
|  |  | Builder | Director | Explorer | Negotiator | Total |
| Male Participant's Type | Builder | 2,653 | 1,395 | 777 | 1,461 | 6,286 |
|  | Director | 1,814 | 1,284 | 688 | 1,558 | 5,344 |
|  | Explorer | 808 | 471 | 323 | 577 | 2,179 |
|  | Negotiator | 1,391 | 1,086 | 492 | 998 | 3,967 |
|  | Total | 6,666 | 4,236 | 2,280 | 4,594 | 17,776 |

For each cell in the table above, the expected total can be calculated by multiplying the row total by the column total, and then dividing by the grand total. This shows the number of participants who would fall into a cell if there were no relationships between the variables.

For instance, the upper-left cell of the table above shows that 1,551 female participants were Builders and they chose to date male Builders. The expected total for this cell was (3897*3757)/10352=1414.3. This cell contained 10% more participants than there would be if female Builders had no preference for or aversion to male Builders, 1551/1414.3=110%.

The table below shows each pair of personality types and the ratio of observed to expected frequencies.

|  | F | M | F-Rev | M-Rev |  |
|---|---|---|---|---|---|
| Builder-Negotiator | 91% | 90% | 93% | 94% | Avoid |

-continued

|  | F | M | F-Rev | M-Rev |  |
|---|---|---|---|---|---|
| Builder-Director | 94% | 93% | 94% | 91% |  |
| Director-Explorer | 96% | 100% | 97% | 91% | Neutral |
| Explorer-Negotiator | 99% | 102% | 89% | 97% |  |
| Director-Director | 100% | 101% |  |  |  |
| Builder-Explorer | 102% | 96% | 102% | 96% |  |
| Negotiator-Negotiator | 103% | 97% |  |  |  |
| Builder-Builder | 110% | 113% |  |  | Attract |
| Director-Negotiator | 112% | 113% | 111% | 115% |  |
| Explorer-Explorer | 121% | 116% |  |  |  |

Bold indicates p < .01.

The F and M columns show the observed/expected ratio for the female and male participant respectively. The F-Rev and M-Rev columns show the ratios for the types reversed, with the first type as the date and the second as the participant (for the first line, Negotiator-Builder rather than Builder-Negotiator).

The type combinations are divided into three groups. No preference or aversion is indicated by ratios close to 100%. An attraction is indicated (higher than expected number) by a cell with a percentage significantly greater than 100%. Avoidance is indicated by a cell with a percentage lower than 100%.

In this example set, Builders dated Negotiators and Directors less frequently than would be expected. Builders dated other Builders more frequently. Explorers also dated Explorers more frequently than expected. Directors dated Negotiators more frequently than expected. All other type pairs dated only as frequently as one would expect from their proportions, indicating no attraction or avoidance based on type. In other scenarios, these personality types could be matched in various other fashions, some of which may be based on particular needs or other statistical findings.

In regards to an example of set of Scale Descriptions (as they would pertain to a given n-line platform), the scale descriptions are based on a sample of 39,913 participants who registered at Chemistry.com, primarily with the goal of finding a romantic partner. Sample characteristics were:
Sample:
56.4% Female
Age: Mean=37.0, Standard deviation=12.6

| Scale characteristics: | | | | |
|---|---|---|---|---|
| Scale | Alpha | Mean | Std. Dev. | Sample item |
| Explorer | 0.790 | 25.98 | 4.85 | I am always looking for new experiences |
| Builder | 0.789 | 26.00 | 4.61 | It is important to respect authority. |
| Director | 0.804 | 25.00 | 5.25 | I like to figure out how things work |
| Negotiator | 0.783 | 26.36 | 5.04 | I feel emotions more deeply than most people |

Each scale consists of 14 items, each rated as:
0: Strongly Disagree
1: Disagree
2: Agree
3: Strongly Agree Thus, the score on each scale can range from 0 to 42 in this example. Alpha is a measure of internal consistency; these scales show moderate internal consistency, which is reasonable in light of each scale's multifaceted nature. The "sample items" shown above are the single items that correlate most strongly with their own scale.

All of the personality type identification tools outlined herein can be employed in software (e.g., an algorithm) or hardware in order to better position individuals in situations in which they are more likely to succeed. For example, a simple algorithm could me developed, modified, or refined to incorporate the statistical information discussed herein. Then the algorithm, potentially working in conjunction with a search engine, can serve up better candidates for a given situation. This could dramatically increase success rates because personality types are being tailored to the given situation.

As a separate matter, the identification of a given personality type could be accorded a certain weight, or suitably positioned in a hierarchy within a process. For example, with respect to online dating, an end user's preferences for dating a certain type of individual (for example, someone who is 'Athletic' or 'prefers to have children') would be balanced with their personality type. In this general sense, the personality type forms one of many data tools that can be used (or in some cases purposely neglected) to better match individuals. The administrator would have discretion in how the personality type finding would be employed in a given algorithm.

Figure 4:
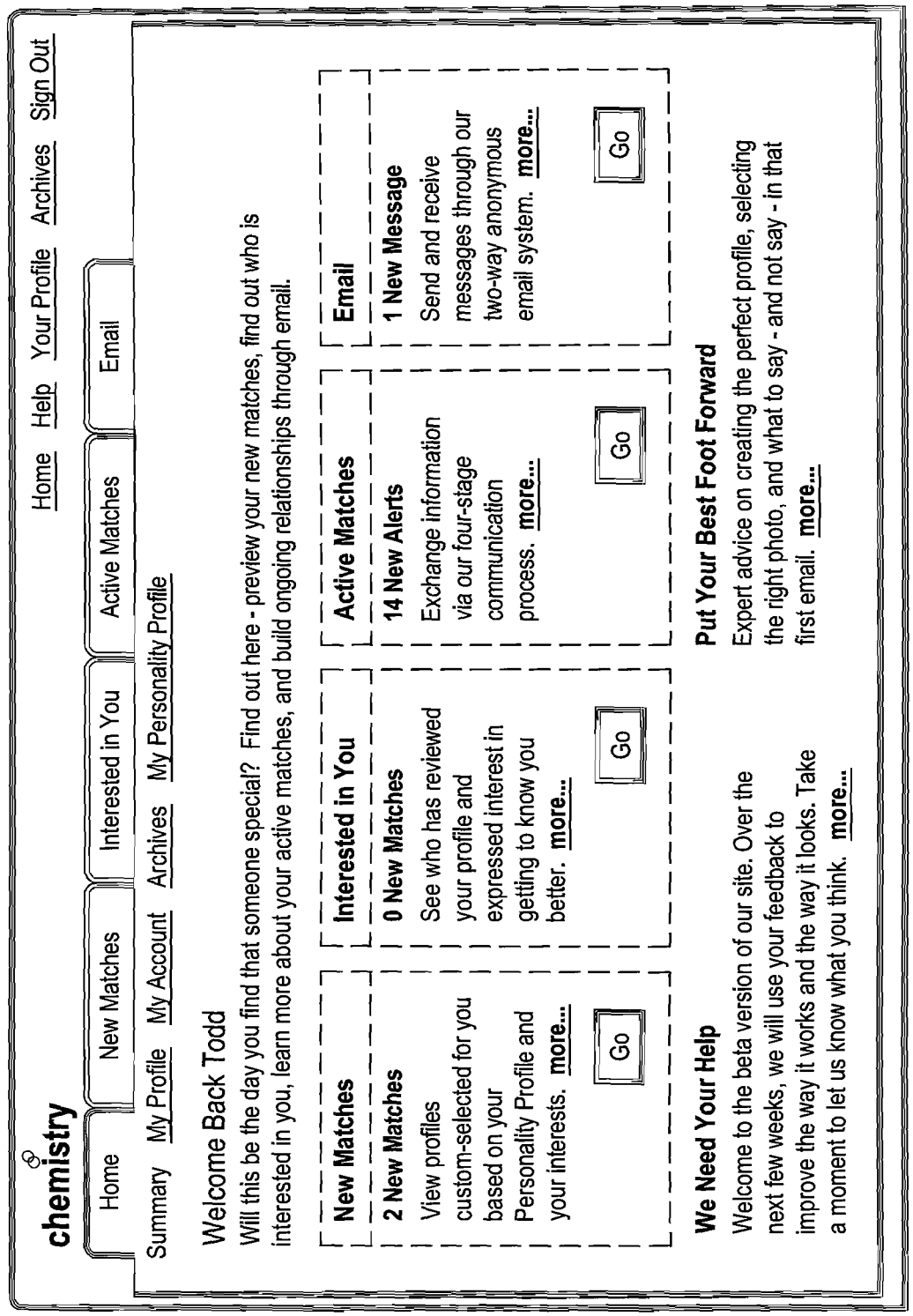
FIG. 4 is a simplified screen shot of an example home page for an end user of the online dating service.

Turning back now to the platform and some of its capabilities, FIG. 4 is a simplified screen shot of an example home page for an end user of the online communications platform. "New Matches" may be based on a compatibility personality profile, which identifies long-term relationship potential through variables such as similar or shared interests, values, background, and goals. Note that the end user's feedback, throughout many of the operations outlined herein, is an integral part of the matching process. The level of interest in potential matches allows system 10 to better understand the end user and what the end user is looking for in a long-term relationship. As system 10 accumulates knowledge about the end user's preferences, system 10 leverages intelligence that can refine matching criteria to bring better, more compatible matches to the end user.

As a general proposition, system 10 is designed to learn from end user feedback (e.g., what the end user likes, who the end user likes, what the end user does not like, etc.). Input is integrated into system 10 so that over time system 10 gets a more complete picture of whom exactly the end user is and whom the end user appears to be seeking. System 10 continually learns about the end user. From the first moment the end user makes a dating decision, system 10 begins to gather and compile important data about end user preferences. Throughout the operations of the site, system 10 queries the end user for feedback (e.g., Are you interested in this match? If so, how much? Do you like the way your match answered this question? If not, what is your preferred answer?). Input is immediately processed and used to reevaluate parameters in hopes of offering more compatible matches for the end user to consider.

Figures 5A, 5B:
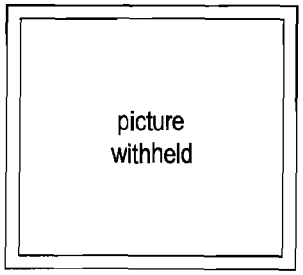
FIGS. 5A-B are simplified screen shots of an example "Interested In You" profile to be used in the online dating service.

FIGS. 5A-B are simplified screen shots of an example "Interested In You" profile to be used in the online communications platform. In particular, FIG. 5A shows that Kristen has indicated a high level of interest in Todd such that she is now in his "Interested in You" queue. FIG. 5B shows Kristen's complete profile, inclusive of her basic information (address, height, weight, etc.), as well as more personal detailed information about her.

FIG. 5C is an example schematic that shows how the "Interested In You" component can operate in one implementation. In one embodiment, there are only five matches that are shown to a given end user per day. This could be provided in an Active Matches queue or in any other type of storage element. Other embodiments include more or less than five matches. Note that there is some intelligent coordination that can take place in such an environment. The following example illustrates such a capability or feature.

In this example, the #2 slot on Todd's list reflects a potential mate named Brooke. However, on Brooke's list of potential matches, Todd is only listed in the #8 slot. Because of his position (and assuming that only five matches will be seen by a given end user), Todd may be seen by Brooke tomorrow, or the day after that, or (in theory) never. Todd's displacement is dependent on new matches that are populated into Brooke's queue.

However, Todd can signal that he is interested in Brooke right now because she is currently occupying his second slot in the list. One positive effect of Todd signaling that he is interested in Brooke is that Brooke will generally rate Todd higher than if she would have simply seen Todd in her Active Matches. This heightened level of attractiveness is fully supported by statistical research and empirical data.

Note that this condition can be exploited in order to achieve greater relationship success for the operator of the communications platform. For example, if Brooke is generally rated a "7" but only dates persons who hold a level of "7" or higher, Brooke's queue can be populated with persons having a "6" rating or higher (through manipulation of the "Interested in You" component of system 10). These people will consistently respond to Brooke's picture/profile by indicating that they are interested in her and, subsequently, she will uniformly rate these 6s much higher (e.g., as 7s or greater). Hence, one way to achieve the desired effect is to populate Todd's New Matches with Brooke: this strategy fully expects Todd to indicate that he is interested in Brooke. Once Brooke receives the signal that Todd is interested in her (i.e. Todd shows up in her "Interested in You" queue), then Brooke will rate Todd higher than his "deserved" 6 designation. Once Brooke inputs a level of interest rating sufficiently high, Todd will be placed in an "active state" (e.g., in active matches for Brooke) such that the relationship progresses to a next level. The flow in such a scenario is Interested in You ($1^{st}$ direction), then Interested in You ($2^{nd}$ direction), then relationship essentials, then short answers, then e-mail, and then a meeting. These stages can readily be modified or changed based on particular needs.

Figure 6D:
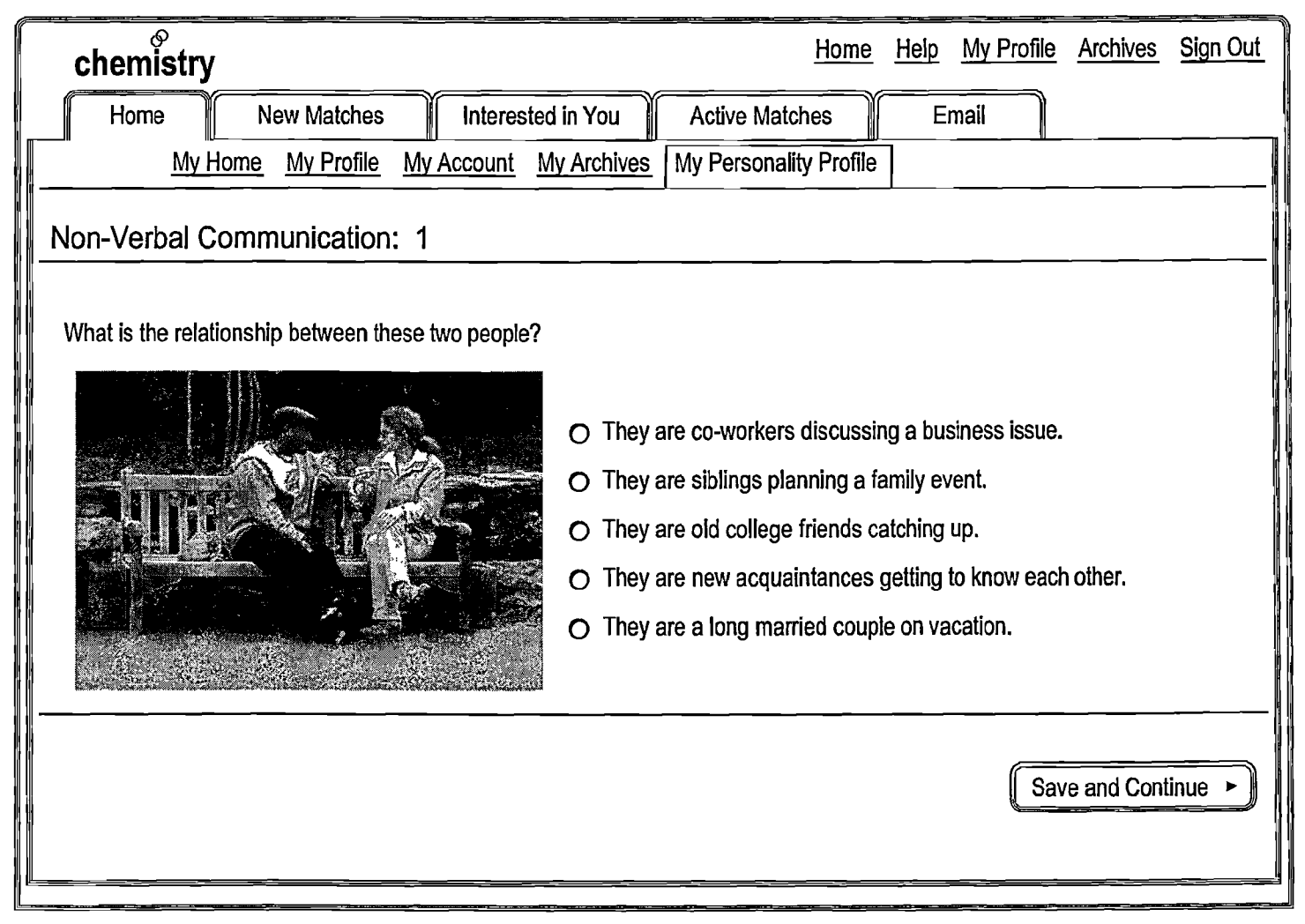
Figure 6E:
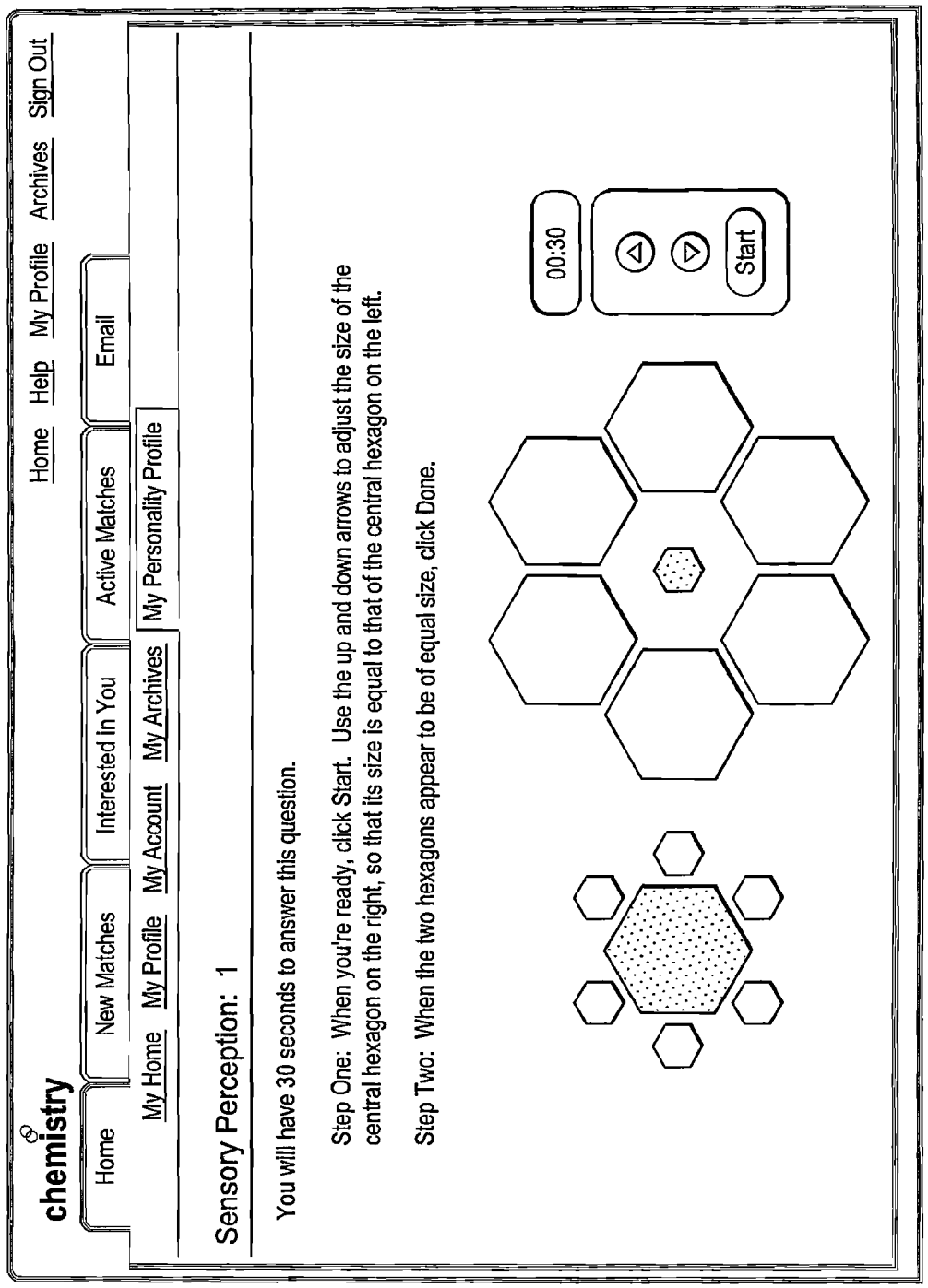
FIGS. 6A-P are simplified screen shots of example phases to be used in the online dating service.
Figure 6F:
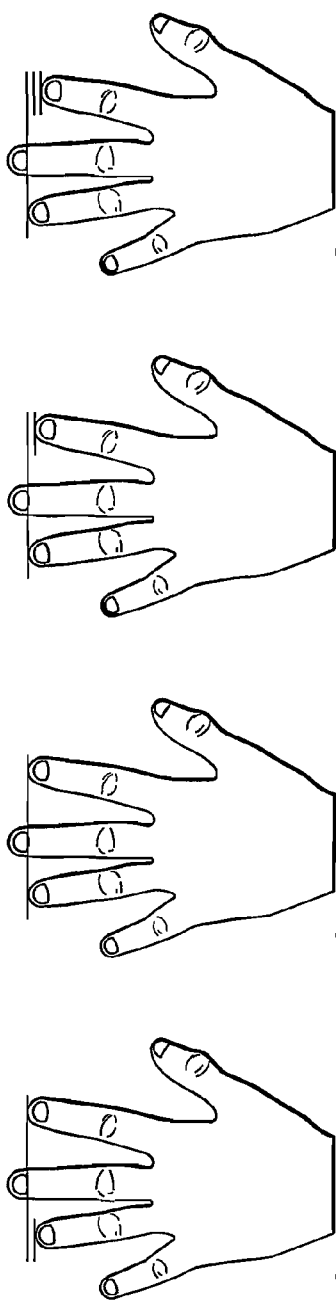

FIGS. 6A-P are simplified screen shots of example phases to be used in an online dating service. FIG. 6A depicts an example personality profile set-up, while FIG. 6B illustrates a core questionnaire component of the platform in which end users are asked questions about their fundamental ideologies. Universal traits are queried in the segment illustrated by FIG. 6C. FIG. 6D illustrates a non-verbal communication screen shot in which a person is asked to give their interpretation of a particular scene. This information can be used in processing and generating an accurate profile for a given individual. FIG. 6E relates to sensory perception, as the end user is asked to complete a quick test under a time constraint. FIG. 6F relates to a biophysical profile for the end user, who is asked to describe their own hand. This has some overlap with the previous FIGURES depicting this hand configuration and its significance. Note that other anatomical features (such as jaw line, feet, torso, waistline, etc.) could also be used as a guide in discerning personality types, levels of chemicals (testosterone, estrogen, serotonin, etc.) in the body.

Figure 6I:
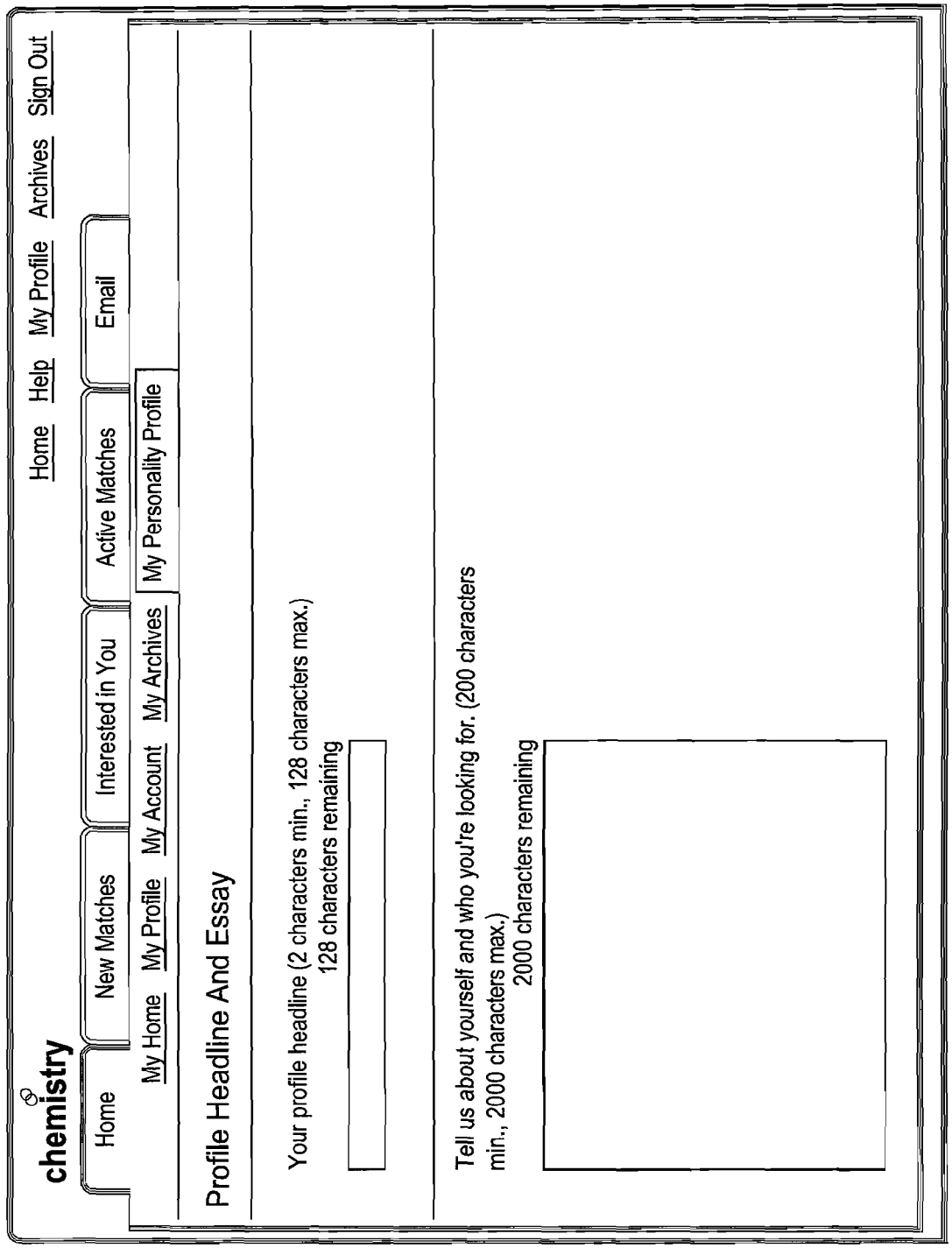

FIG. 6G simply queries the end user for his preferences for ethnicity, religion, etc. It should also be noted that an accompanying slider bar is provided to gauge the importance of each of these qualities. FIG. 6H illustrates a dual-slider bar in which two elements are considered together. A profile headline and essay are requested in FIG. 6I, which solicits additional thoughts from the end user.

FIGS. 6J-K illustrate how two people are matched using all of the information provided previously. This intelligent matching is a result of numerous algorithms and (potentially) judgment calls or configurations made by managers of the platform. The weight of this information may be based on anthropological considerations, scientific studies, levels of testosterone/estrogen, and/or any other designations (which may be simply a choice made by one or more operators of the website). Considerable flexibility is provided by the platform of the present invention, as virtually any parameter may be evaluated, considered, and accorded a selected weight for purposes of enhancing the dating experience for the individual.

Figure 6M:
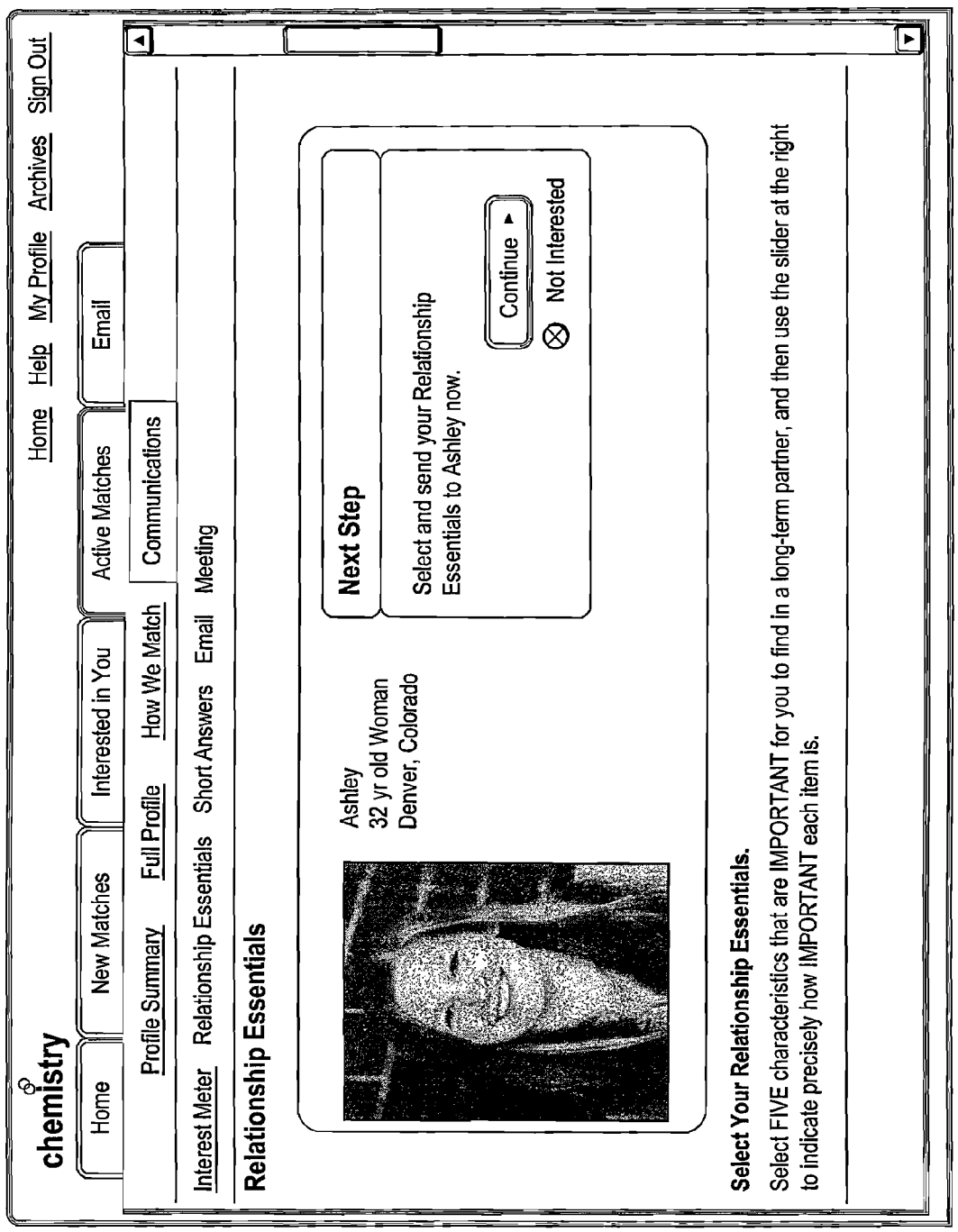
Figure 6P:
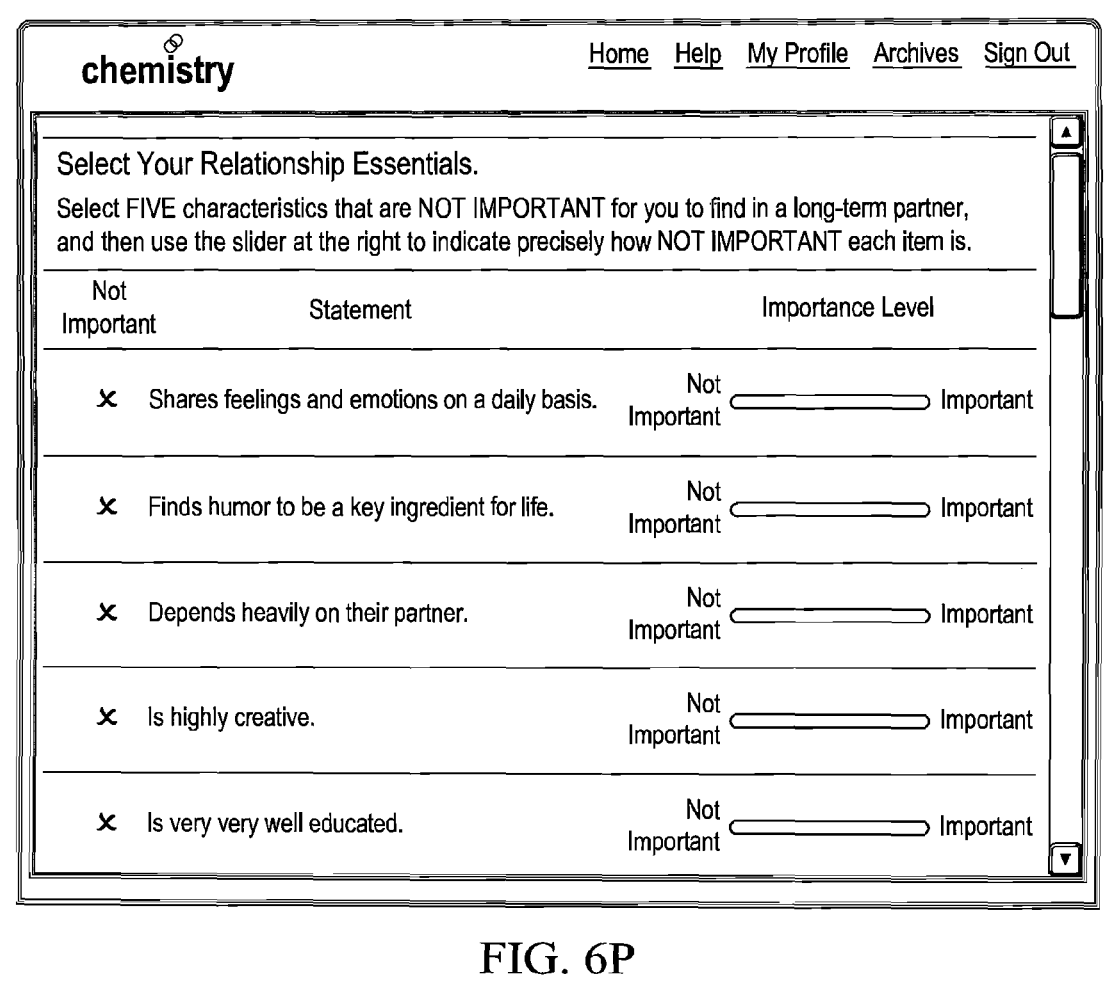

FIG. 6L illustrates this particular end user's personality traits as compared to his counterpart (Liz). Note that in this case (as illustrated by the graphical illustration), there is good congruency in character traits between these two individuals. FIG. 6M illustrates how the end user is prompted to send their relationship essentials to a potential match. FIGS. 6N-O illustrate an end user selecting seven (7) relationship essentials to be sent to their dating counterpart. FIG. 6P illustrates an example relationship essentials layout. A number of slider bars are provided to make end user selections in this regard.

As evidenced by the preceding FIGURES and by the accompanying description, these phases focus on the true interests and preferences of members of the online dating community. The information gathered is solicited in different ways and is highly interactive. Moreover, such tests are fun and easy to complete, as the end user can quickly navigate through these preliminary steps. However, their simplicity should not hide their significance; these tests provide critical information that is to be used in addressing compatibility issues and, furthermore, enhancing the chances of long-term dating success.

Some of the steps illustrated in the preceding FIGURES may be changed or deleted where appropriate and additional steps may also be added to the process flows. These changes may be based on specific communication architectures or particular interfacing arrangements and configurations of associated elements and do not depart from the scope or the teachings of the present invention. It is important to recognize that the FIGURES illustrate just one of a myriad of potential implementations of system 10.

Although the present invention has been described in detail with reference to particular embodiments, it should be understood that various other changes, substitutions, and alterations may be made hereto without departing from the spirit and scope of the present invention. For example, although the present invention has been described with reference to a dating protocol, any service that deals with connecting people together could readily benefit from the present invention. Hence, the central website of the present invention could readily be associated with a job seeking service, a person finder service, an athletic service, a real estate service, an academic service, a real estate finding service, an escort service, or any other service where matching is of some significance.

Moreover, although the present invention has been described with reference to a number of elements included within system 10, these elements may be rearranged or positioned in any appropriate manner to accommodate any suitable networking configurations. In addition, any of the elements of FIG. 1 may be provided as separate external components to system 10 or to each other where appropriate.

It should also be noted that any of the question portions of the platform can leverage any type of format. Thus, in establishing a personality profile, in generating a pre-date profile, in executing relationship essentials, in answering short answer questions, any suitable question format can be employed. Example formats include a Yes/No format, a multiple choice question format, a short answer format, a true/false format, etc. Other formats can readily be used in order to achieve the desired responses.

Additionally, it should be noted that the personality determination tools (related to word choice, hand measurements along with other anthropological features, responses to questions, levels of chemicals, etc.) can be used in any suitable combination to select appropriate matches. This could involve intentionally ignoring some or all of these in matching two candidates. The administrator can certainly configure any appropriate weighting for these components and choose to exclude any one of these. All such permutations are clearly within the broad scope of the present invention.

Numerous other changes, substitutions, variations, alterations, and modifications may be ascertained to one skilled in the art and it is intended that the present invention encompass all such changes, substitutions, variations, alterations, and modifications as falling within the scope of the appended claims.

What is claimed is:

1. An apparatus, comprising:
a server that includes a processor and a memory, the server being configured to interface with one or more end users and to manage information related to one or more of the end users, wherein the server is further configured to determine a personality type for one or more end users from a particular set of personality types and to match end users based on at least one end-user designated preference and on relationship rules of the personality types in the particular set of personality types, the rules outlining compatibilities between the personality types in the particular set of personality types, wherein the personality type of a user is determined from the particular set of personality types, and the determination of personality type from the particular set of personality types is based, at least in part, on:
answers from the end users to questions provided by a central website including questions prompting end users for responses to pictures of human smiles, each response to a picture of a human smile including an end user assessment of whether the pictured smile is one of genuine or artificial, wherein the responses to questions prompting end users for responses to pictures of human smiles are used to infer hormonal levels of the respective end user and the determination of personality type from the particular set of personality types is further based on the inferred hormonal levels of the respective end user;
word choices from the end users as found in the answers; and
a frequency of word usage from the end users in the answers.

2. The apparatus of claim 1, wherein the determination of personality type from the particular set of personality types is based on inferred levels of testosterone, serotonin, or estrogen of the respective end user based at least in part on the answers to the questions provided by the central website.

3. The apparatus of claim 1, wherein the central website is configured to facilitate an online dating operation such that one or more of the end users are capable of interacting in order to find candidates that match their interests.

4. The apparatus of claim 1, wherein the information is provided in a profile, which includes relevant characteristics of corresponding end users, and wherein the profile is used in conjunction with the personality type determination to match two or more end users.

5. The apparatus of claim 4, wherein an administrator weights the profile and the personality determination within an algorithm that matches the end users.

6. The apparatus of claim 1, wherein the central website is associated with a job seeking service, a person finder service, an athletic service, a real estate service, an academic service, a real estate finding service, or an escort service.

7. The apparatus of claim 1, wherein the particular set of personality types includes Director, Negotiator, Explorer, and Builder personality types.

8. A method comprising:
interfacing with one or more end users via a server that includes a processor device and a memory;
managing information related to one or more of the end users;
determining, using one or more processing devices, a personality type for one or more end users from a particular set of personality types; and
matching, using one or more processing devices, end users based on at least one end-user designated preference and on relationship rules of the personality types in the particular set of personality types, whereby the rules are based on statistically validated compatibilities between the personality types in the particular set of personality types, wherein the personality type of a user is determined from the particular set of personality types, and the determination of personality type from the particular set of personality types is based, at least in part, on:
answers from the end users to questions provided by a central website including questions prompting end users for responses to pictures of human smiles, each response to a picture of a human smile including an end user assessment of whether the pictured smile is one of genuine or artificial, wherein the responses to questions prompting end users for responses to pictures of human smiles are used to infer hormonal levels of the respective end user and the determination of personality type from the particular set of personality types is further based on the inferred hormonal levels of the respective end user;
word choices from the end users as found in the answers; and
a frequency of word usage from the end users in the answers.

9. The method of claim 8, wherein the determining of the personality type from the particular set of personality types includes an evaluation of a hand of a selected end user.

10. The method of claim 8, wherein the determination of personality type from the particular set of personality types is further based on inferred levels of testosterone, serotonin, or estrogen.

11. The method of claim 8, wherein the central website is configured to facilitate an online dating operation such that one or more of the end users are capable of interacting in order to find candidates that match their interests, and wherein an administrator weights the profile and the personality determination within an algorithm that matches the end users.

12. The method of claim 10, wherein the questions include questions prompting end users for information describing physical characteristics of a hand of the respective end user.

13. The method of claim 12, wherein answers to questions prompting end users for information describing physical characteristics of hands of the end users are used to infer hormonal levels of the respective end user.

14. The method of claim 11, wherein determination of personality type from the particular set of personality types is further based, at least in part, on word choices from the end users included in the end user interactions within the online dating operation, and a frequency of word usage from the end users in the end user interactions within the online dating operation.

15. The method of claim 8, wherein the particular set of personality types includes Director, Negotiator, Explorer, and Builder personality types.

16. Software for providing a feature in a network environment, the software being embodied in a computer readable non-transitory medium and comprising computer code such that when executed by a processor in an electronic environment is operable to:
  interface with one or more end users via a central website;
  manage information related to one or more of the end users;
  determine a personality type for one or more end users from a particular set of personality types; and
  match end users based on at least one end-user designated preference and on relationship rules of the personality types in the particular set of personality types, the rules being based on validated compatibilities between the personality types in the particular set of personality types, wherein the personality type of a user is determined from the particular set of personality types, and the determination of personality type from the particular set of personality types is based, at least in part, on:
  answers from the end users to questions provided by a central website including questions prompting end users for responses to pictures of human smiles, each response to a picture of a human smile including an end user assessment of whether the pictured smile is one of genuine or artificial, wherein the responses to questions prompting end users for responses to pictures of human smiles are used to infer hormonal levels of the respective end user and the determination of personality type from the particular set of personality types is further based on the inferred hormonal levels of the respective end user;
  word choices from the end users as found in the answers; and
  a frequency of word usage from the end users in the answers.

17. The medium of claim 16, wherein the code for determining the personality type from the particular set of personality types includes an evaluation of a hand of a selected end user.

18. The medium of claim 16, wherein the determination of personality type from the particular set of personality types is further based on inferred levels of testosterone, serotonin, or estrogen.

19. The medium of claim 16, wherein the central website is configured to facilitate an online dating operation such that one or more of the end users are capable of interacting in order to find candidates that match their interests, and wherein an administrator weights the profile and the personality determination within an algorithm that matches the end users.

20. The medium of claim 16, wherein the particular set of personality types includes Director, Negotiator, Explorer, and Builder personality types.

\* \* \* \* \*